(12) United States Patent
Van Natter et al.

(10) Patent No.: US 7,729,483 B2
(45) Date of Patent: Jun. 1, 2010

(54) METHODS, SYSTEMS, AND COMPUTER PROGRAMS FOR GENERATING A BILLING STATEMENT FROM DETAILED USAGE FILE RECORDS

(75) Inventors: Douglas Van Natter, Birmingham, AL (US); Bettye Shratter, Birmingham, AL (US); Ronald Proctor, Birmingham, AL (US); Linda Wigley, Kimberly, AL (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 1057 days.

(21) Appl. No.: 11/431,390

(22) Filed: May 10, 2006

(65) Prior Publication Data

US 2007/0274498 A1  Nov. 29, 2007

(51) Int. Cl.
*H04M 1/00* (2006.01)
*H04M 15/00* (2006.01)

(52) U.S. Cl. ............................ 379/114.03; 379/115.01; 379/121.02; 379/121.05; 713/154; 709/217; 709/218; 709/219

(58) Field of Classification Search ................. 379/111, 379/114.01, 114.03, 115.01, 115.03, 121.01, 379/121.02, 121.06, 126, 127.05
See application file for complete search history.

(56) References Cited

U.S. PATENT DOCUMENTS

| | | | |
|---|---|---|---|
| 5,712,908 A * | 1/1998 | Brinkman et al. | 379/114.28 |
| 5,757,895 A * | 5/1998 | Aridas et al. | 379/136 |
| 5,835,856 A | 11/1998 | Patel | 455/406 |
| 5,881,138 A | 3/1999 | Kearns et al. | 379/114 |
| 5,920,613 A | 7/1999 | Alcott et al. | 379/114 |
| 5,943,406 A | 8/1999 | Leta et al. | 379/120 |
| 6,023,500 A | 2/2000 | Kearns et al. | 379/114 |
| 6,198,811 B1 | 3/2001 | Klose et al. | 379/133 |
| 6,252,951 B1 | 6/2001 | Alcott et al. | 379/114 |
| 6,418,207 B1 | 7/2002 | Kearns et al. | 379/114.06 |
| 6,442,267 B2 * | 8/2002 | Culli et al. | 379/220.01 |
| 6,498,840 B2 | 12/2002 | Alcott et al. | 379/126 |
| 6,546,093 B1 | 4/2003 | Klose et al. | 379/133 |
| 6,636,585 B2 | 10/2003 | Salzberg et al. | 379/22 |
| 6,639,975 B1 | 10/2003 | O'Neal et al. | 379/112.02 |
| 6,639,978 B2 | 10/2003 | Draizin et al. | 379/114.21 |
| 6,654,451 B1 | 11/2003 | Ward | 379/114.24 |
| 6,665,386 B1 | 12/2003 | Klose et al. | 379/112.01 |
| 6,678,355 B2 | 1/2004 | Eringis et al. | 379/22 |
| 6,678,363 B2 | 1/2004 | Kearns et al. | 379/112.01 |
| 6,697,469 B1 * | 2/2004 | Koster | 379/114.29 |
| 6,721,761 B2 | 4/2004 | Nagy et al. | 707/104.1 |
| 6,748,062 B2 | 6/2004 | Alcott et al. | 379/111 |
| 6,836,763 B1 | 12/2004 | Munsil et al. | 705/34 |

(Continued)

*Primary Examiner*—Binh K Tieu
(74) *Attorney, Agent, or Firm*—Cantor Colburn LLP

(57) ABSTRACT

Methods, systems, and computer programs for constructing a billing statement from detailed usage file (DUF) records received from an Incumbent Local Exchange Carrier (ILEC). A master file contains routing information associating each of a plurality of telephone numbering plan addresses plus additional telephone number digits (NPA-NXX) with a corresponding local access transport area (LATA). Telephone operator services (TOPS) assignment files are downloaded and used to edit the master file, thereby generating an enhanced master file. DUF records are downloaded. A set of enhanced DUF records is generated by filtering the downloaded DUF records. A rate table of customer price plans is applied to the set of enhanced DUF records and the enhanced master file to construct a billing statement.

23 Claims, 35 Drawing Sheets

U.S. PATENT DOCUMENTS

| | | |
|---|---|---|
| 6,842,511 B1 | 1/2005 | Paiz ...................... 379/115.01 |
| 6,898,570 B1 | 5/2005 | Tedesco et al. ................ 705/14 |
| 6,937,710 B1 | 8/2005 | Griffiths ................ 379/112.06 |
| 6,954,519 B2 | 10/2005 | Kearns et al. .......... 379/112.06 |
| 6,965,668 B2 | 11/2005 | Clark et al. ................. 379/116 |
| 6,968,319 B1 | 11/2005 | Remington et al. ........... 705/40 |
| 6,990,182 B2 | 1/2006 | Nelson .................... 379/114.2 |
| 7,424,103 B2 * | 9/2008 | Kernohan et al. ........... 379/126 |
| 7,573,997 B2 * | 8/2009 | Culli et al. ............. 379/221.02 |
| 7,609,826 B2 * | 10/2009 | Liu et al. .................... 379/126 |
| 2001/0034704 A1 * | 10/2001 | Farhat et al. .................. 705/39 |
| 2007/0274498 A1 * | 11/2007 | Natter et al. ........... 379/220.01 |

\* cited by examiner

| CALL TYPE COLUMN 201 | ADUF RECORD IDENTIFIER COLUMN 203 | EXPLANATORY NOTES COLUMN 205 |
|---|---|---|
| North American originated and terminated carrier access usage | 11-01-01 | Originating ADUF record populates Indicators Field 187 (FIG.1) with "1" Corresponding cancel/killer ADUF record is 50-01-01. |
| North American originated and terminated carrier access usage | 11-01-01 | Originating ADUF record populates Indicators Field 187 (FIG.1) with "2" Corresponding cancel/killer ADUF record is 50-01-01. |
| North American terminated carrier access usage | 11-01-16 | Terminating ADUF record for 1-900 services. Corresponding cancel/killer ADUF record is 50-01-16. |
| Carrier access usage 1-800 database service | 11-01-25 | The record corresponding to this ADUF record identifier is used to report access minutes of use for 1-800 database services completed by an Exchange Carrier (EC). Corresponding cancel/killer ADUF record is 50-01-25. |
| North American originated and terminated usage for Directory Assistance | 11-01-32 | The record corresponding to this ADUF record identifier is used to report access minutes of use for Directory Assistance service. |
| North American originated and overseas terminated carrier access usage | 11-02-01 | The record corresponding to this ADUF record identifier is used to report access minutes of use for calls terminating to international numbers |
| ADUF killer/cancel record 103 | 50-XX-XX | This ADUF record identifier is used when an ADUF record previously sent should be cancelled and not billed |
| ADUF header record 104 | 20-24-09 | ADUF header record for data information |
| ADUF trailer record 105 | 20-24-10 | ADUF trailer record for data information |

*FIG. 3*
(PRIOR ART)

| CALL TYPE COLUMN 401 | ODUF RECORD IDENTIFIER COLUMN 403 | EXPLANATORY NOTES COLUMN 405 |
|---|---|---|
| Related IntraLATA Toll- Sent Paid | 01-01-01 | Sent Paid calls have Message Type Field 383 (FIG. 3A)=1 and Rate Class Field 385 (FIG. 3A)=4 (Dial Station) or 5 (Operator completed but dial rate applies). For operator assisted Sent Paid calls, a surcharge typically applies. These Sent Paid calls are identified by a Rate Class=1 (Person to Person) or 3 (Station to Station). |
| Related IntraLATA Toll- Collect | 01-01-01 | Collect calls have Message Type Field=1 and Rate Class Field=1, 3, or 6. If the surcharge depends upon the type of operator handling, then the Rate Class Field=1 for operator handled person, 3 for operator handled station, or 6 for automated collect. |
| Related IntraLATA Toll- Third Party | 01-01-01 | Third party calls have Message Type Field=2 and Rate Class Field=1, 3, or 6. If the surcharge depends upon the type of operator handling, then the Rate Class Field=1 for operator handled person, 3 for operator handled station, or 6 for automated third party. |
| Directory Assistance (DA) | 01-01-32 | Set portion of Indicators Field 387 (FIG. 3A) representing "To Number" to equal 411 or XXX-555-1212 |
| DA Call Completion... | 01-01-32 | The corresponding ODUF record is the recording of the call to Directory Assistance. |
| and DA call completion... | 01-01-18 | The corresponding ODUF record is the Directory Assistance Call Completion (DACC) flat charge record. Not sent for UNE attempts |
| and DA Call Completion. | 01-01-01 or 01-01-31 | The corresponding ODUF record is the recording of the actual call completed by the operator. Only sent if the end user has a usage-sensitive calling plan or for toll records. |

*FIG. 5A*
(PRIOR ART)

| CALL TYPE COLUMN 401 | ODUF RECORD IDENTIFIER COLUMN 403 | EXPLANATORY NOTES COLUMN 405 |
|---|---|---|
| Enhanced Directory Assitance | 01-01-32 | Set portion of Indicators Field 387 representing "To Place"=NDA and "Type of DA"=4. |
| Busy Line Verification | 01-01-35 | Conversation time is not applicable. The charge is strictly a flat rate amount for operator work effort. |
| Busy Line Interupt | 01-01-37 | Conversation time is not applicable. The charge is strictly a flat rate amount for operator work effort. |
| Information Service (976-XXXX numbers) | 01-01-16 | Set portion of Indicators Field 387 representing "To Number NXX"=976. |
| N11 | 01-01-18 | Set portion of Indicators Field representing "To Number NXX"=N11 (i.e., 311, 511, or 711). |
| N11 Summary Rated | 42-50-02 | Set portion of Indicators Field 387 representing Charge Phrase to contain N11 charge or N11 credit. Set portion of Indicators Field 387 representing Miscellaneous Text Code to contain a value of 10 for N11 charge or a value of 11 for N11 credit. |
| Unrelated IntraLATA Toll-Sent Paid | 10-01-01 | Sent Paid calls have Message Type Field 383 (FIG. 3A)=1 and Rate Class Field 385 (FIG. 3A)=4 (Dial Station) or 5 (Operator completed but dial rate applies). For operator assisted Sent Paid calls, a surcharge typically applies. These Sent Paid calls are identified by a Rate Class=1 (Person to Person) or 3 (Station to Station). |

*FIG. 5B*
(PRIOR ART)

| CALL TYPE COLUMN 401 | ODUF RECORD IDENTIFIER COLUMN 403 | EXPLANATORY NOTES COLUMN 405 |
|---|---|---|
| Unrated IntraLATA Toll–Collect | 10-01-01 | Collect Calls have Message Type Field=4 and Rate Class Field=1,3, or 6. If the surcharge depends upon the type of operator handlinig, then the Rate Class Field=1 for operator handled person, 3 for operator handled station, or 6 for automated collect. |
| Unrated IntraLATA Toll–Third Party | 10-01-01 | Third party Calls have Message Type Field=2 and Rate Class Field=1,3, or 6. If the surcharge depends upon the type of operator handlinig, then the Rate Class Field=1 for operator handled person, 3 for operator handled station, or 6 for automated third party. |
| Unrated Local Call–Sent Paid | 10-01-31 | These are provided only for measured lines or when the particular local call involves a billable charge. Sent Paid calls have Message Type Field 383 (FIG. 3A)=1 and Rate Class Field 385 (FIG. 3A)=4 (Dial Station) or 5 (Operator completed but dial rate applies). For operator assisted Sent Paid calls, a surcharge typically applies. These Sent Paid calls are identified by a Rate Class=1 (Person to Person) or 3 (Station to Station). |
| Unrated Local Call–Collect | 10-01-31 | Collect Calls have Message Type Field=4 and Rate Class Field=1,3, or 6. If the surcharge depends upon the type of operatorhandlinig, then the Rate Class Field=1 for operator handled person, 3 for operator handled station, or 6 for automated third party. |
| Unrated Local Call–Third Party | 10-01-31 | Third party Calls have Message Type Field=2 and Rate Class Field=1,3, or 6. If the surcharge depends upon the type of operatorhandlinig, then the Rate Class Field=1 for operator handled person, 3 for operator handled station, or 6 for automated third party. |

*FIG. 5C*
(PRIOR ART)

| CALL TYPE COLUMN 401 | ODUF RECORD IDENTIFIER COLUMN 403 | EXPLANATORY NOTES COLUMN 405 |
|---|---|---|
| Call Return-Activation Charge | 10-01-19 | Portion of Indicators Field 387 representing "To Number" and "From Number" are not populated. |
| Call Trace | 10-01-19 | Portion of Indicators Field 387 representing "To Number" and "From Number" are not populated. |
| Three Way Calling-Activation Charge | 10-01-19 | Portion of Indicators Field 387 representing "To Number" and "From Number" are not populated. |
| Repeat Dialing | 10-01-19 | Portion of Indicators Field 387 representing "To Number" and "From Number" are not populated. |
| Directory Assistance (DA) | 10-01-32 | Portion of Indicators Field 387 representing "To Number" are set to equal 411 or XXX-555-1212. |
| DA Call Completion... | 10-01-32 | The corresponding ODUF record is the recording of the call to Directory Assistance. |
| and DA call completion... | 10-01-18 | The corresponding ODUF record is the Directory Assistance Call Completion (DACC) flat charge record. Not sent for UNE attempts. |
| and DA Call Completion. | 01-01-01 or 01-01-31 | The corresponding ODUF record is the recording of the actual call completed by the operator. Only sent if the end user has a usage-sensitive calling plan or for toll records. |
| Enhanced Directory Assitance | 10-01-32 | Portion of Indicators Field 387 representing "To Place" are set to NDA and portion of Indicators Field 387 representing "Type of DA" are set to 4. |
| Voice Message Service | 10-01-17 | Certain voice mail services involve usage charges for time accessing mailbox. |

*FIG. 5D*
(PRIOR ART)

| CALL TYPE COLUMN 401 | ODUF RECORD IDENTIFIER COLUMN 403 | EXPLANATORY NOTES COLUMN 405 |
|---|---|---|
| Zipconnect and Uniserv Service. | 10-01-18 | Portion of Indicators Field 387 representing "From Number" does not equal portion of Indicators Field 387 representing "Billing Number". Portion of Indicators Field representing "To Number NXX" are set to 203, 530, 930, or 440. Message Type Field 383 (FIG. 3A)=1. |
| Busy Line Verification | 10-01-35 | Conversation time is not applicable |
| Busy Line Interupt | 10-01-37 | Conversation time is not applicable |
| Incoming Back up Line | 10-01-18 | Portion of Indicators Field 387 (FIG. 3A) representing "From Number" contains back up line number. Portion of Indicators Field 387 representing "To Number" contains all zeroes. Portion of Indicators Field 387 representing "To Place" contains all zeroes. |
| Resold 800 records | 01-01-25 | These records are sent when resold 800 services are ordered. This is a rated catagory type but it is an unrated message. This is an exception within industry standards. |
| Credit Records | 03-XX-XX | These types of records are sent when a customer requests credit from the operator for poor transmission, wrong number or cutoff. |

*FIG. 5E*
(PRIOR ART)

| CALL TYPE COLUMN 401 | ODUF RECORD IDENTIFIER COLUMN 403 | EXPLANATORY NOTES COLUMN 405 |
|---|---|---|
| Cancel Records | 51-XX-XX 58-XX-XX | One of these types of records are sent when a previously sent record should be cancelled and not billed. |
| UNE Attempts | 10-01-XX | These types of records are sent for Operator Services traffic carried by ILEC and associated with Unbundled Switch Ports when calls are not completed. |
| Operator General Assistance Calls | 10-01-XX | These types of records are sent for General Assistance calls to Operator Services traffic. Portion of Indicators Field 387 representing the "To Number" are set to equal Portion of Indicators Field 387 representing the "From Number" so that these types of records can be easily identified. |
| Header Record | 20-24-01 | ODUF header record for data information |
| Trailer Record | 20-24-02 | ODUF trailer record for data information |

*FIG. 5F*
(PRIOR ART)

BILL NO: 770-555-1212 602                         1401

LOCAL USAGE FOR OFFICE ATLNGABUDS2
MAY 23 04 THRU MAY 23 04
                                            1403

| RATE CATEGORY | | | QUANTITY | RATE | AMOUNT |
|---|---|---|---|---|---|
| PLAN | RATE | COUNT | | | |
| UNBUNDLED LOCAL SWITCHING-SWITCHING FUNCTIONALITY<br>   ACCESS<br>      TERMINATING<br>         MAY 23-MAY 23 | | | | | |
| OULSC | ULS-SF | 1 | 1 | 0.000615300 | 0.01 |
| TOTAL ULS-SF | | | 1 | | 0.01 |
| | | | | | |

TOTAL UNBUNDLED END OFFICE CHARGES                     0.01

TOTAL USAGE CHARGES (MAY 23 - MAY 23)                0.01

*FIG. 13*

BILL NO: 770-555-1212 602

LOCAL USAGE FOR OFFICE ATLNGABUDS2
AUG 28 04 THRU SEP 27 04

1501

1503

| RATE CATEGORY | | | QUANTITY | RATE | AMOUNT |
|---|---|---|---|---|---|
| PLAN | RATE | COUNT | | | |
| UNBUNDLED TRANSPORT SHARED TRANSPORT LOCAL     UNDETERMINED ROUTING        ORIGINATING | | | | | |
| OUST1 | UIT-MILES | | | | |
| | ALPRGAMA47C | 019 MILES | 4 | 0.000002700 | 0.01 |
| | AUG 28 THRU | SEP 27 | | | |
| | | | | | |
| | ATLAGABUCA0 | 006 MILES | 18 | 0.000002700 | 0.01 |
| | AUG 28 THRU | SEP 27 | | | |
| | | | | | |
| | ATLAGAMVDS3 | 006 MILES | 39 | 0.000002700 | 0.01 |
| | AUG 28 THRU | SEP 27 | | | |
| | | | | | |
| | | | | | |

TOTAL UT SHARED TRANSPORT            61            0.03

*FIG. 14*

BILL NO: 770-555-1212 602

1601

LOCAL USAGE FOR OFFICE ATLNGABUDS2
AUG 28 04 THRU SEP 27 04

1603

| RATE CATEGORY | | | QUANTITY | RATE | AMOUNT |
|---|---|---|---|---|---|
| PLAN | RATE | COUNT | | | |
| UNBUNDLED MISCELLANEOUS 800 ACCESS 10 DIGIT SCREENING AUG 28 – SEP 27 | | | | | |
| OU8Q1 | | 216 | 216 | 0.000854300 | 0.18 |
| | | | | | |
| | | | | | |
| | | | | | |

| RATE CATEGORY | | | QUANTITY | RATE | AMOUNT |
|---|---|---|---|---|---|
| PLAN | RATE | COUNT | | | |
| DIRECTORY ASSISTANCE CALL COMPLETION AUG 28 – SEP 27 | | | | | |
| OUCC1 | | 2 | 2 | 0.100000000 | 0.20 |
| | | | | | |
| | | | | | |
| | | | | | |

TOTAL UNBUNDLED MISCELLANEOUS CHARGES (AUG 28 – SEP 27)   0.38

TOTAL USAGE CHARGES (AUG 28 – SEP 27)   0.41

TOTAL USAGE CHARGES (ALL PERIODS)   0.42

*FIG. 15*

METHODS, SYSTEMS, AND COMPUTER PROGRAMS FOR GENERATING A BILLING STATEMENT FROM DETAILED USAGE FILE RECORDS

BACKGROUND

The present invention relates generally to telephony, and more particularly, to methods and systems for generating a billing statement from detailed usage file records.

FIG. 1 is a block diagram illustrating conventional functional relationships between an incumbent local exchange carrier (ILEC) 20 and one or more competitive local exchange carriers, such as a first CLEC 30 and a second CLEC 40. ILEC 20, illustratively BellSouth, SBC, or Verizon, may lease a portion of their telecommunications network to one or more CLECs, such as first CLEC 30. This leased portion, by way of example comprising telephone line 70 running between a central office (CO) switch 10 and a first customer premises 80, telephone line 72 running between CO switch 10 and a second customer premises 90, as well as all or a portion of CO switch 10, are referred to as an unbundled network element (UNE) 50. Although ILEC 20 is equipped to gather network usage data for both the leased and the unleased portions of its network, some of this data would be useful to first CLEC 30 for purposes of reconciling a billing statement that CLEC 30 receives from ILEC 20, and for investigating billing disputes raised by customers of CLEC 30. Accordingly, ILEC 20 may sell or offer detailed usage files to first CLEC 30. These detailed usage files identify one or more messages carried by UNE 50. Detailed usage files include any of an access daily usage file (ADUF) 52, an optional daily usage file (ODUF) 54, and an enhanced optional daily usage file (EODUF) 56.

ADUF 52 provides electronic billing data for messages that are captured by a billing system implemented by ILEC 20. More specifically, ADUF 52 provides first CLEC 30 with daily information of end users' originating and terminating access messages carried by ILEC 20. These access messages include, but are not limited to, the following types of calls: (a) calls originating at ILEC 20 or first CLEC 30; (b) calls terminating at ILEC 20 or first CLEC 30; (c) calls originating at an independent telephone company (ICO) and terminating at UNE 50; (d) facility-based first CLEC 30 calls terminating at UNE 50; (e) calls from a wireless network that terminate at UNE 50; (f) ILEC 20-carried, intra-local access transport area (IntraLATA) toll calls from an ILEC 20 end-user terminating at UNE 50; (g) 1-800 calls; (h) 1-900 calls; (i) directory assistance calls; and (j) originating calls to international numbers.

ADUF 52 permits first CLEC 30 to analyze the manner in which end users are originating and terminating carrier messages. This information enables first CLEC 30 to charge carriers for access messages as appropriate. First CLEC 30 may also use ADUF 52 for marketing analysis in accordance with federal law. Studying call volumes and patterns enables first CLEC 30 to design services which better meet customer needs.

FIGS. 2A and 2B set forth illustrative prior art data structures for transmitting ADUF records from ILEC 20 (FIG. 1) to first CLEC 30 (FIG. 1) utilizing an industry standard packaging concept known as Exchange Message Interface (EMI). Further documentation regarding EMI is available from the Alliance for Telecommunications Industry Solutions (ATIS) website at http://www.atis.org/atis/clc/obf/obfdocs.htm. Each of a plurality of respective ADUF records, such as first, second, third, fourth, and fifth ADUF records 120, 121, 122, 123, 124 (FIGS. 2A and 2B) is associated with a corresponding ADUF record identifier 101, 131, 141, 151, 161, respectively. Each ADUF record identifier 111, 131, 141, 151, 161 is formed using eight fields 111, 112, 113, 114, 115, 116, 117, and 118 in a format denoted as XX-XX-XX, where X represents an alphabetic or numeric character and the dash represents a separator between adjacent characters. First, second, third, fourth, and fifth ADUF records 120-124 are each in a fixed block format of 210 bytes. This fixed block format illustratively includes an indicators field 187 in first ADUF record 120.

There are several different categories of ADUF records 120-124, represented by access message 102, ADUF killer/cancel record 103, ADUF header record 104, and ADUF trailer record 105. These categories are identified by placing specified characters in one or more of fields 111, 112, 114 and 115 of an ADUF record identifier 101 as follows. Access message 102 utilizes an ADUF record identifier 131 formatted as 11-XX-XX. ADUF killer/cancel record 103 utilizes an ADUF record identifier 141 formatted as 50-01-XX. ADUF header record 104 uses ADUF record identifier 151 formatted as 20-24-09, and an ADUF trailer record 105 uses ADUF record identifier 161 formatted as 20-24-10.

ADUF killer/cancel record 103 is employed when a previously sent access message 102 should be cancelled and not billed. It is possible that, contemporaneously with an access message 102 being transmitted from ILEC 20 (FIG. 1) to first CLEC 30, second CLEC 40 issues a service order for the purpose of changing the service provider of the end user from first CLEC 30 to second CLEC 40. Since the service provider of the end user has changed and the new service provider should bill the message specified by access message 102 (FIG. 2A), an ADUF killer/cancel record 103 is generated to instruct first CLEC 30 (FIG. 1) not to bill the message. Contemporaneously with generation of ADUF killer/cancel record 103 (FIG. 2A), a copy of access message 102 is sent to second CLEC 40 (FIG. 1).

FIG. 3 is a table setting forth a plurality of illustrative prior art ADUF record identifiers which may be used for ADUF record identifier 101 (FIG. 2A). Each of a plurality of call types in call type column 201 (FIG. 3) is associated with a corresponding ADUF record identifier in ADUF Record Identifier Column 203. Explanatory notes regarding the call types in call type column 201 are provided in Explanatory Notes Column 205. ADUF records including a sequence of ADUF record identifiers 101 (FIG. 2A) are transmitted from a Revenue Accounting Office (RAO) associated with ILEC 20 (FIG. 1) using a LAN-to-LAN link, a dial-up connection, or a secure file transfer protocol (FTP) mailbox. Alternatively or additionally, these ADUF records could be mailed to the CLEC on a CDROM or similar storage medium.

In addition to ADUF 52 (FIG. 1), ILEC 20 may offer optional detailed usage files to first CLEC 30. These optional files include optional daily usage file (ODUF) 54 and an enhanced optional daily usage file (EODUF) 56. ODUF 54 includes electronic billing data for billable messages that are carried over UNE 50, processed in a billing system used by ILEC 20, and billed by ILEC 20 to first CLEC 30. ODUF 54 includes electronic billing data for operator handled calls originating from first CLEC 30 subscriber lines if first CLEC 30 purchases operator services from ILEC 20. Rated incollect calls (calls originated at ILEC 20 or from independent telephone companies (ICOs)) are intermingled with recorded rated and unrated network usage of UNE 50 by first CLEC 30.

ODUF 54 provides first CLEC 30 with daily access to end users' local usage of UNE 50. This minimizes the need for first CLEC 30 to wait for receipt of periodic billing statements from ILEC 20 as a prerequisite for first CLEC 30 billing its own end users. As with ADUF 52, ODUF 54 may also be used as a valuable marketing analysis tool in accordance with federal law. Moreover, ODUF 54 is a valuable tool in the battle against fraud. Daily access to customer data gives first CLEC the opportunity to review large volumes of usage data associated with particular end users. It also provides an opportunity to establish specific end user limits on toll charges.

FIGS. 4A-4C set forth illustrative prior art data structures for transmitting ODUF records from ILEC 20 (FIG. 1) to first CLEC 30 utilizing the aforementioned industry standard packaging concept known as Exchange Message Interface (EMI). Each of a plurality of respective ODUF records, such as first, second, third, fourth, fifth, sixth, seventh, eighth, and ninth ODUF records 320, 321, 322, 323, 324, 325, 326, 327, 328 (FIGS. 4A-4C) is associated with a corresponding ODUF record identifier 301, 331, 341, 351, 361, 371, 381, 391, 393, respectively. Each ODUF record identifier 301, 331, 341, 351, 361, 371, 381, 391, 393 is formed using eight fields 311, 312, 313, 314, 315, 316, 317, and 318 in a format denoted as XX-XX-XX, where X represents an alphabetic or numeric character and the dash represents a separator between adjacent characters. First through ninth ODUF records 320-328 are each in a variable block format (175 bytes plus modules). This format is illustratively denoted using a message type field 383, a rate class field 385, and an indicators field 387 in first ODUF record 320.

There are several different categories of ODUF records 320-328, represented by unrated message 302, rated message 303, ODUF header record 304, ODUF trailer record 305, credit message 306, summary message 307, first ODUF killer/cancel record 308, and second ODUF killer/cancel record 309. These categories are identified by placing specified characters in one or more of fields 311, 312, 314 and 315 of an ODUF record identifier 301 as follows. Unrated message 302 utilizes an ODUF record identifier 331 formatted as 10-XX-XX. Rated message 303 utilizes an ODUF record identifier 341 formatted as 01-XX-XX; ODUF header record 304 uses an ODUF record identifier 351 formatted as 20-24-01; ODUF trailer record 305 uses an ODUF record identifier 361 formatted as 20-24-02; credit message 306 uses an ODUF record identifier 371 formatted as 03-XX-XX; summary message 307 uses an ODUF record identifier 381 formatted as 42-XX-XX; first ODUF killer/cancel record 308 utilizes an ODUF record identifier 391 formatted as 51-XX-XX; and second ODUF killer/cancel record 309 uses an ODUF record identifier 393 formatted as 58-XX-XX.

First ODUF killer/cancel record 308, or second ODUF killer/cancel record 309, is employed when a previously sent ODUF record should be cancelled and not billed. It is possible that, contemporaneously with a rated message 303 being transmitted from ILEC 20 (FIG. 1) to first CLEC 30, second CLEC 40 issues a service order for the purpose of changing the service provider of the end user from first CLEC 30 to second CLEC 40. Since the service provider of the end user has changed and the new service provider should bill the message specified by rated message 303 (FIG. 4A), an ODUF killer/cancel record (either first ODUF killer/cancel record 308 or second ODUF killer/cancel record 309) is generated to instruct first CLEC 30 (FIG. 1) not to bill the message. Contemporaneously with generation of the aforementioned ODUF killer/cancel record, a copy of rated message 303 (FIG. 4A) is sent to second CLEC 40 (FIG. 1).

FIGS. 5A-5F together comprise a table setting forth a plurality of illustrative prior art ODUF record identifiers which may be used for ODUF record identifier 301 (FIG. 4A). Each of a plurality of call types in call type column 401 (FIGS. 5A-5F) is associated with a corresponding ODUF record identifier in ODUF Record Identifier Column 403. Explanatory notes regarding the call types in call type column 401 are provided in Explanatory Notes Column 405. ODUF records including a sequence of ODUF record identifiers 301 (FIG. 4A) are transmitted from a Revenue Accounting Office (RAO) associated with ILEC 20 (FIG. 1) using a LAN-to-LAN link, a dial-up connection, or a secure file transfer protocol (FTP) mailbox. Alternatively or additionally, these ODUF records could be mailed to the CLEC on a CDROM or similar storage medium.

As stated above, in addition to ADUF 52 and ODUF 54 (FIG. 1), ILEC 20 may offer optional detailed usage files to first CLEC 30. These optional files include an enhanced optional daily usage file (EODUF) 56. EODUF 56 provides first CLEC 30 with usage data for local calls that originate from resold flat rate business and residential lines. If first CLEC 30 subscribes to EODUF 56, then EODUF messages are distributed to first CLEC 30 intermingled with ODUF 54 messages.

Although ADUF 52, ODUF 54, and EODUF 56 provide potentially useful information to first CLEC 30, significant limitations apply to the manner in which this information may be used by first CLEC 30 for purposes of bill reconciliation. ADUF 52, ODUF 54, and EODUF 56 are intended to provide first CLEC 30 with messages that may eventually be billed to end users of first CLEC 30. However, ADUF 52, ODUF 54, and EODUF 56 are not intended to enable first CLEC 30 to reconcile billing statements that it receives from ILEC 20. If first CLEC 30 attempts to use ADUF 52, ODUF 54, or EODUF 56 as a tool for reconciling these ILEC billing statements, certain conditions will cause apparent discrepancies between information obtained from ADUF 52, ODUF 54, or EDUF 56 and information obtained from ILEC billing statements.

One potential source of inconsistency between ODUF 54 and ILEC billing statements relates to timing issues. As a practical matter, ODUF 54 records are sent to first CLEC 30 on a daily basis, Monday through Friday, except on holidays. The ILEC billing statement can be prepared on any of a plurality of different workdays during a typical month, causing message day cutoffs that vary from month to month. Therefore, discrepancies may occur in reconciling ODUF 54 with the ILEC billing statement.

In view of the foregoing limitations of the prior art, what is needed is a technique by which a CLEC may use existing ADUF, ODUF, and/or EODUF records to generate a verification version of a billing statement that accurately reflects CLEC usage of the ILEC's UNE, and so as to accurately recreate an original version of a billing statement received from the ILEC.

BRIEF SUMMARY

According to exemplary embodiments, the needs described above and others are met by providing methods and systems for constructing a billing statement from a plurality of detailed usage file (DUF) records received from an incumbent local exchange carrier (ILEC). Optionally, the constructed billing statement may be compared with an issued billing statement prepared by the ILEC, thus permitting a reconciliation of the two billing statements.

Exemplary embodiments include a method for constructing a billing statement from a plurality of detailed usage file (DUF) records relating to usage of an unbundled network element (UNE). The method includes downloading a master file from an incumbent local exchange carrier (ILEC). The master file contains routing information associating each of a plurality of telephone numbering plan addresses plus additional telephone number digits (NPA-NXX) with a geographically defined local access transport area (LATA). One or more telephone operator services (TOPS) assignment files are downloaded, each TOPS assignment file including a list of one or more TOPS switches that are used for calls originating at a particular NPA-NXX. An enhanced master file is generated by using the one or more TOPS assignment files to edit the master file. A plurality of DUF records are downloaded. The downloaded DUF records are filtered to generate a set of enhanced DUF records. A rate table associating each of a plurality of end users with customer price plans is downloaded. Information about calls placed by each of a plurality of end users is extracted from the set of enhanced DUF records and the enhanced master file. The extracted information is applied to the customer price plans in the rate table to generate a constructed billing statement that reflects usage of the UNE.

The method can also be viewed as providing systems for computing financial data. In this regard, embodiments of the system can be broadly summarized as including a computer system with a digital computer connected to receive information comprising a master file, one or more telephone operator service (TOPS) assignment files, a plurality of daily usage file records, and a rate table from data input means. The computer system outputs computed data to a data presentation mechanism, and saves the output data to a mechanism for electronically storing output data. A mechanism is provided for automatically controlling the computer to compute the data from the information. The data represent a constructed billing statement relating to usage of an unbundled network element (UNE). The master file contains routing information associating each of a plurality of telephone numbering plan addresses plus the next three telephone number digits (NPA-NXX) with a geographically defined local access transport area (LATA). The one or more telephone operator services (TOPS) assignment files each include a list of one or more TOPS switches that are used for calls originating at a particular NPA-NXX. The rate table associates each of a plurality of end users with customer price plans. The data is computed from the information by generating an enhanced master file using the one or more TOPS assignment files to edit the master file, filtering the DUF records to generate a set of enhanced DUF records, extracting information about calls placed by each of a plurality of end users from the set of enhanced DUF records and the enhanced master file, and applying the extracted information to the customer price plans in the rate table to generate the constructed billing statement reflecting usage of the UNE.

The systems and methods can also be viewed as providing computer program products for establishing a trusted network. In this regard, embodiments of the system can be broadly summarized as including a computer program product for establishing a trusted network. The computer program product includes a storage medium readable by a processing circuit and storing instructions for execution by the processing circuit for facilitating a method. The facilitated method includes downloading a master file from an incumbent local exchange carrier (ILEC). The master file contains routing information associating each of a respective plurality of telephone numbering plan addresses plus the next three telephone number digits (NPA-NXX) with a corresponding geographically defined local access transport area (LATA). One or more telephone operator services (TOPS) assignment files are downloaded, each TOPS assignment file including a list of one or more TOPS switches that are used for calls originating at a particular NPA-NXX. An enhanced master file is generated by using the one or more TOPS assignment files to edit the master file. A plurality of DUF records are downloaded. The downloaded DUF records are filtered to generate a set of enhanced DUF records. A rate table associating each of a plurality of end users with customer price plans is downloaded. Information about calls placed by each of a plurality of end users is extracted from the set of enhanced DUF records and the enhanced master file. The extracted information is applied to the customer price plans in the rate table to generate a constructed billing statement that reflects usage of the UNE.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIG. 3 is a table setting forth a plurality of illustrative prior art ADUF record identifiers;

FIGS. 5A-5F together comprise a table setting forth a plurality of illustrative prior art ODUF identifiers;

FIG. 13 depicts a first portion of an illustrative billing statement prepared using the methods of FIGS. 7-12L, showing an unbilled item from a previous billing period;

FIG. 14 depicts a second portion of an illustrative billing statement prepared using the methods of FIGS. 7-12L, showing a mileage-based rate element; and FIG. 15 depicts a third portion of an illustrative billing statement prepared using the methods of FIGS. 7-12L, showing a count-based rate element and total usage charges.

The detailed description explains exemplary embodiments, together with advantages and features, by way of example with reference to the drawings.

DETAILED DESCRIPTION OF EXEMPLARY EMBODIMENTS

Figure 6:
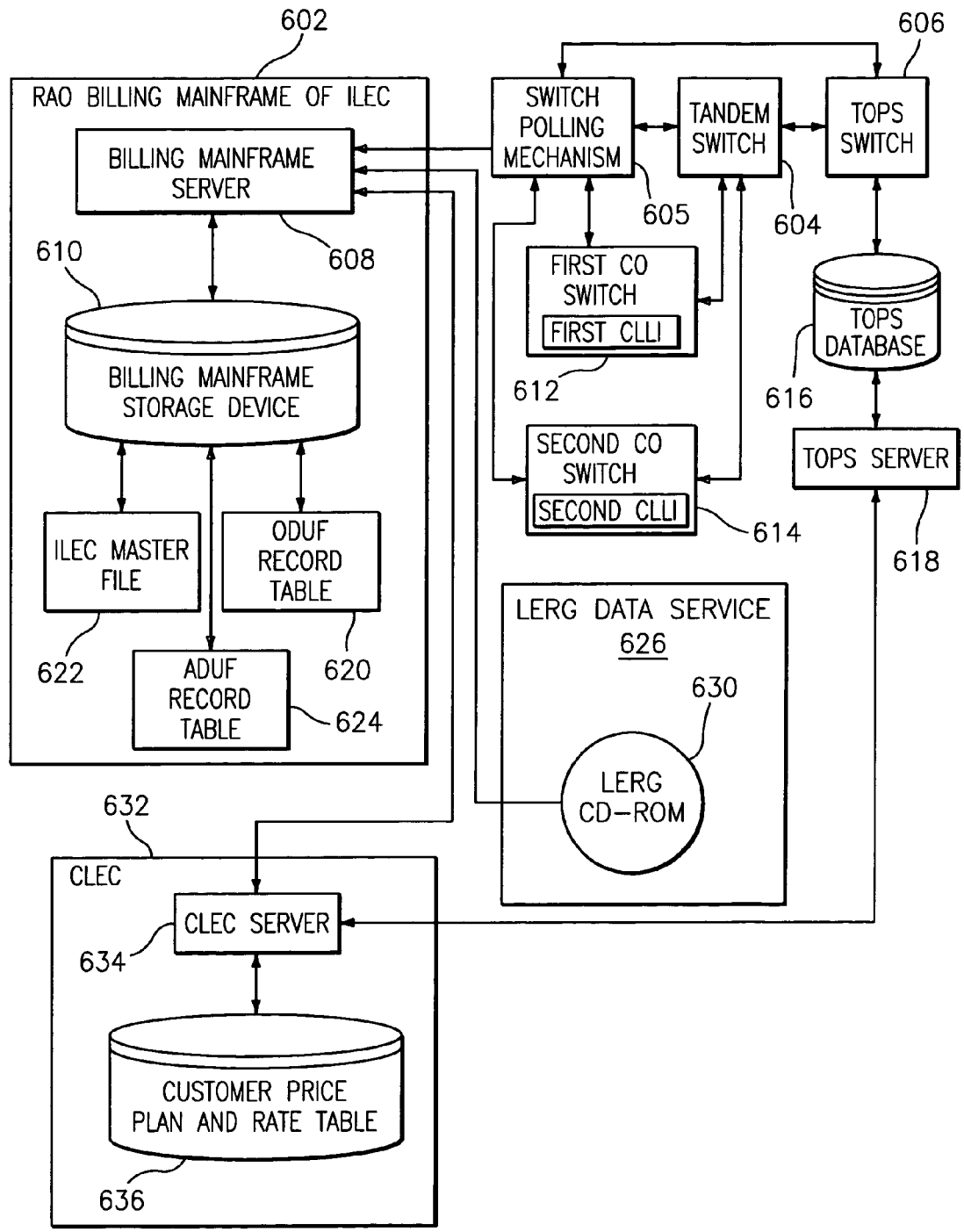
FIG. 6 is a block diagram showing an overall operational environment for various illustrative embodiments.

FIG. 6 is a block diagram showing an overall operational environment for various illustrative embodiments. A regional accounting office (RAO) billing mainframe of an incumbent local exchange carrier (ILEC) 602 includes a billing mainframe server 608 coupled to a billing mainframe storage device 610. Billing mainframe storage device 610 is equipped to store an ILEC master file 622, an ADUF record table 624, and an ODUF record table 624. Billing mainframe server 608 may be implemented using one or more personal computers (PCs), a central processing unit, or any of various processing mechanisms understood to those skilled in the art. Billing mainframe storage device 610 may be implemented using any computer-readable storage medium such as, but not limited to, one or more computer disk drives, a CD-ROM device, magnetic storage media, bubble memory, semiconductor memory, optical memory, or the like.

Figure 2A:
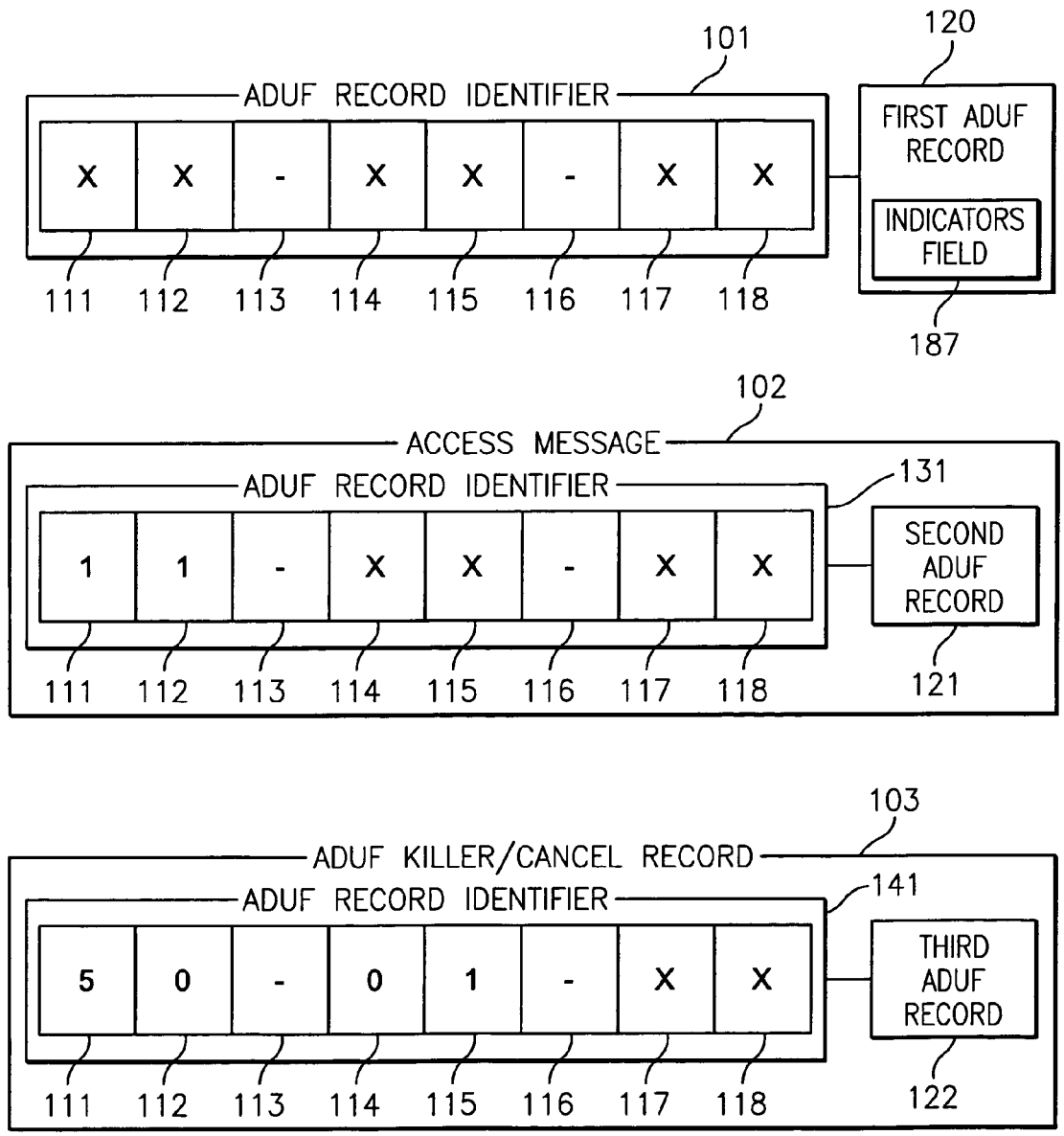
FIGS. 2A and 2B set forth illustrative prior art data structures for transmitting access daily usage file (ADUF) records from the ILEC to the first CLEC of FIG. 1.
Figure 2B:
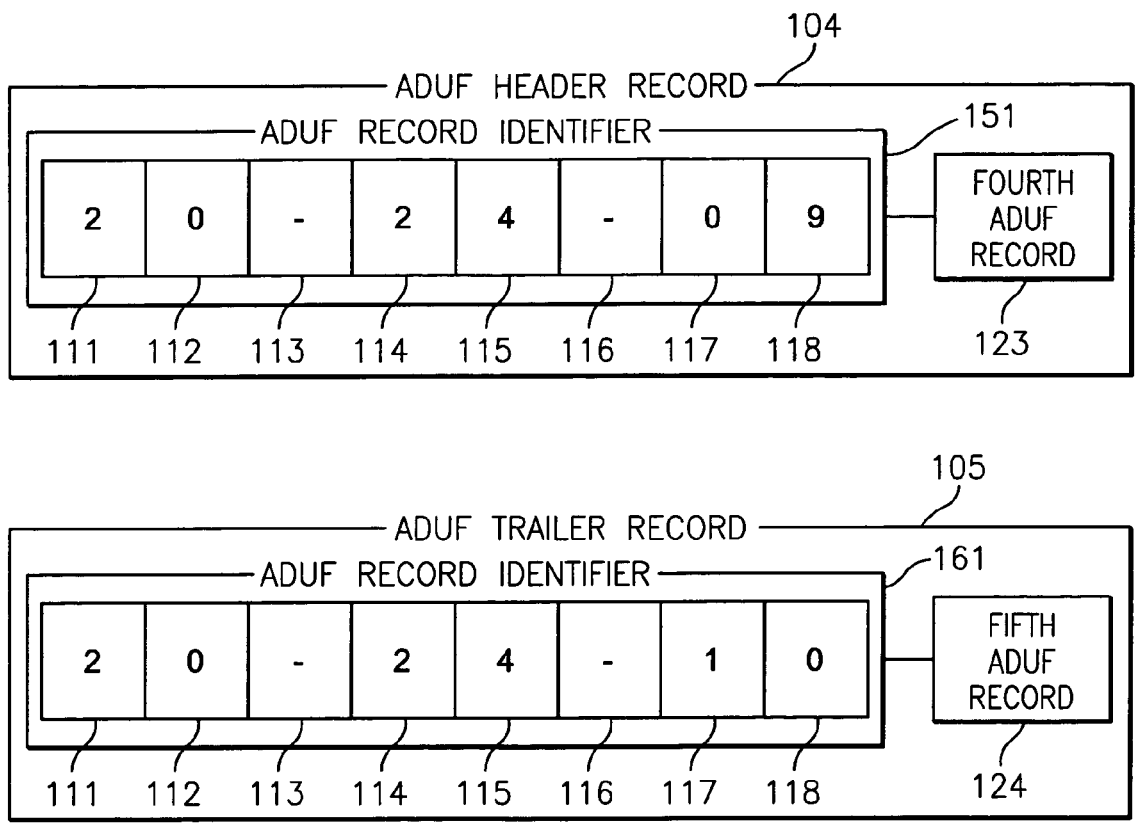
Figure 4A:
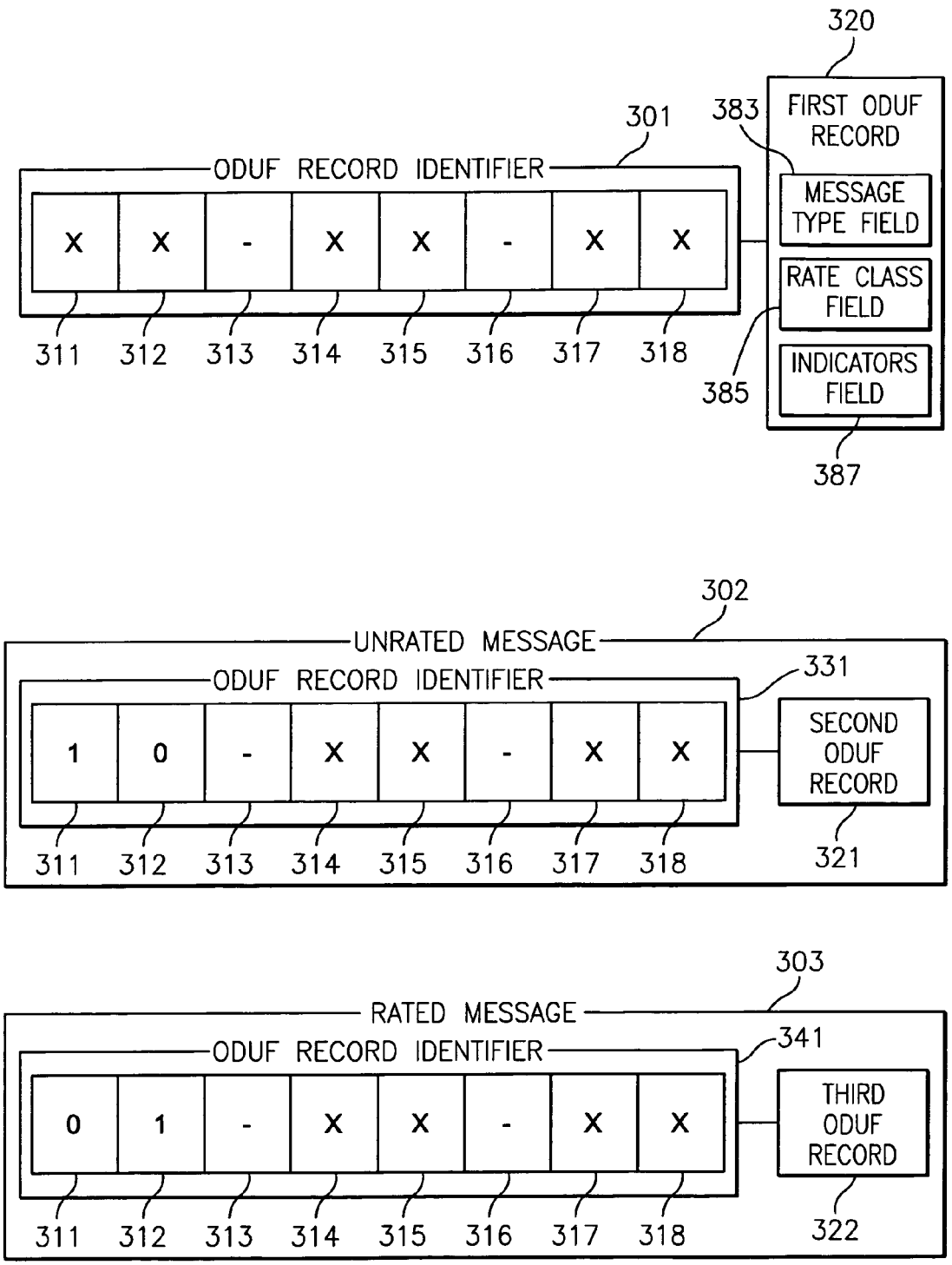
FIGS. 4A-4C set forth illustrative prior art data structures for transmitting optional daily usage file (ODUF) records from the ILEC to the first CLEC of FIG. 1.
Figure 4B:
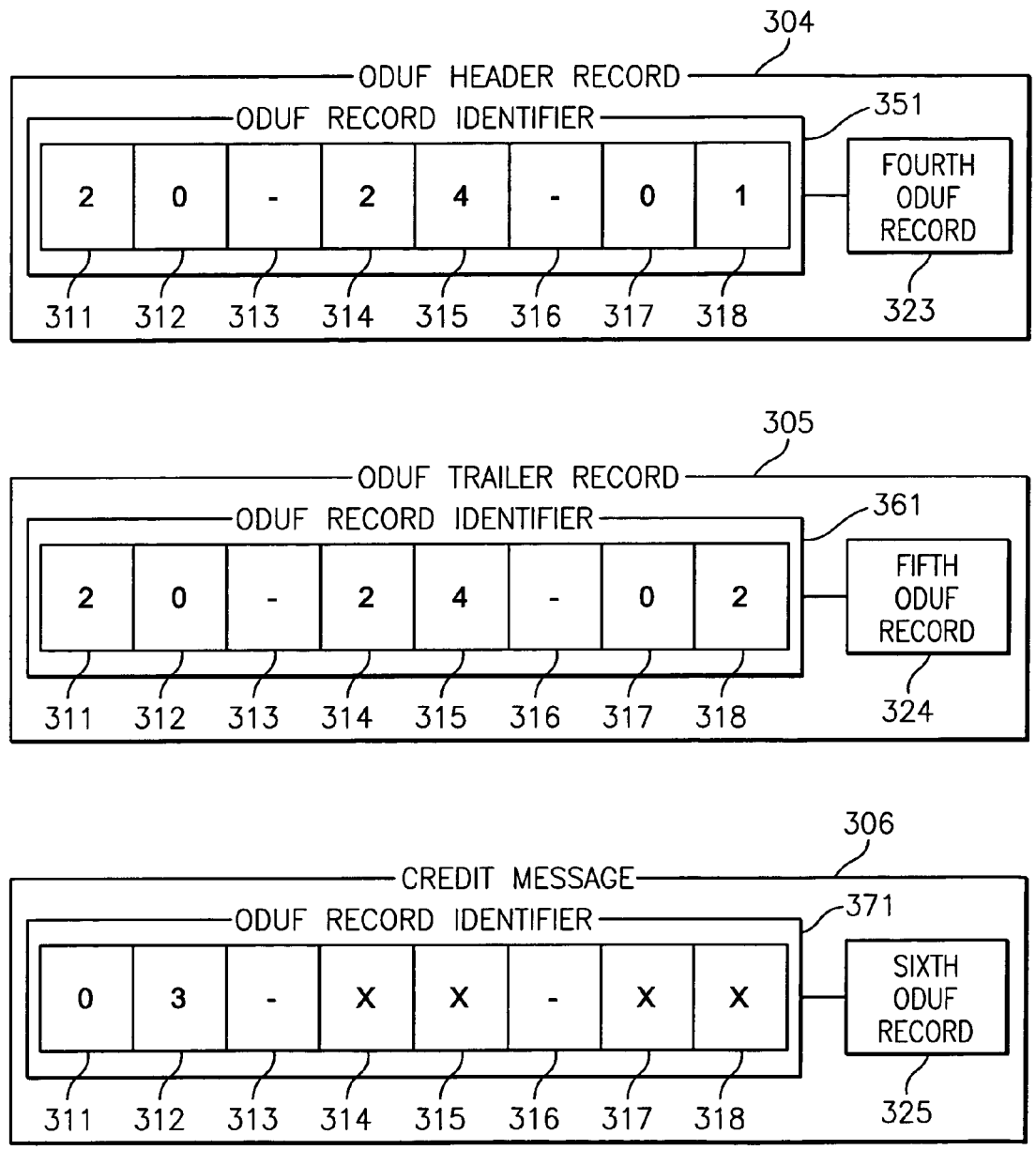
Figure 4C:
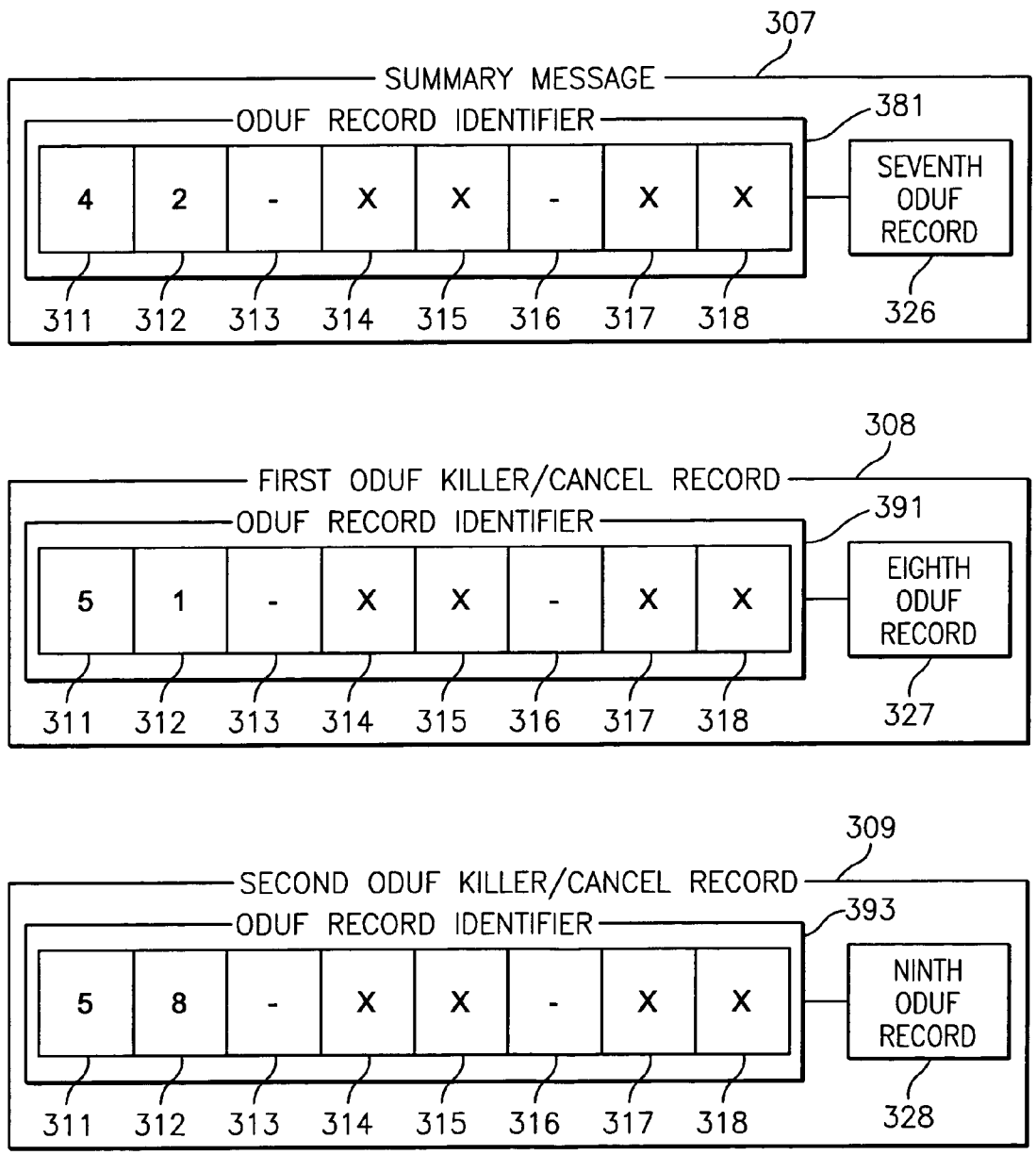

ILEC master file 622 includes routing information associating each of respective telephone numbering plan addresses plus the next three telephone number (NPA-NXX) addresses with a corresponding geographically defined local access transport area (LATA). ADUF record table 624 includes a plurality of access daily usage files of the type shown in FIGS. 2A-2B (discussed above). ODUF record table 620 includes a plurality of optional daily usage files of the type shown in FIGS. 4A-4C (discussed above).

Billing mainframe server 608 is equipped to communicate with a competitive local exchange carrier (CLEC) server 634 at CLEC 632, a local exchange routing guide (LERG) server at LERG data service 626, and a tandem switch 604 via switch polling mechanism 605. CLEC server 634 is equipped to access a customer price plan and rate table 636 associating each of a plurality of customer identifiers with at least one of a price plan identifier and a rate identifier. A price plan identifier identifies a corresponding price plan, and a rate identifier identifies a corresponding rate. As in the case of billing mainframe server 608, CLEC server 634 may be implemented using one or more personal computers (PCs), a central processing unit, or any of various processing mechanisms well known to those skilled in the art. Customer price plan and rate table 636 may be stored using any computer-readable storage medium such as, but not limited to, one or more computer disk drives, a CD-ROM device, magnetic storage media, bubble memory, semiconductor memory, optical memory, or the like.

LERG data service 626 provides a LERG CD-ROM 630 containing information defining the specific LATA within which a given telephone number is located. More specifically, LERG CD-ROM 630 contains a table associating each of a plurality of switches with one or more NPA-NXX's handled by the switch, the name of the municipality in which the switch is located, the vertical and horizontal coordinates of the switch (similar to latitude and longitude), and an identifier specifying the company that owns the switch. LERG data service 626 may distribute updated LERG CD-ROMs 630 on a periodic or repeated basis, such as once a month. Although LERG data service 626 is described as providing LERG data in the form of LERG CD-ROM 630, this is for illustrative purposes only, as LERG data may be provided by LERG data service 626 using any computer-readable storage medium such as, but not limited to, one or more magnetic disks, data storage drives, magnetic storage media, bubble memory, optical memory, semiconductor memory, or the like.

Tandem switch 604 is adapted to route calls between a first central office (CO) switch 612 and a second CO switch 614. Illustratively, first CO switch 612 serves a different geographic area relative to second CO switch 614. First CO switch 612 is assigned a first common language location identifier (CLLI) that uniquely identifies the first CO switch. Likewise, second CO switch 614 is assigned a second CLLI that uniquely identifies the second CO switch.

Tandem switch 604 is also adapted to route calls between the first CO switch 612 (or the second CO switch 614) and a telephone operator services (TOPS) switch 606. TOPS switch 606 uses a TOPS database 616 (and, optionally, live operators) to provide operator services to customers (end users) who access first CO switch 612 or second CO switch 614. TOPS database 616 is stored using any computer-readable storage medium such as, but not limited to, one or more computer disk drives, a CD-ROM device, magnetic storage media, bubble memory, semiconductor memory, or the like. TOPS database 616 may be accessed by a TOPS server 618 in communication with CLEC server 634 at CLEC 632. TOPS database 616 is capable of storing one or more TOPS assignment files, each TOPS assignment file including a list of one or more TOPS switches that are used for calls originating at a particular NPA-NXX. TOPS server 618 may be implemented using one or more personal computers (PCs), a central processing unit, or any of various processing mechanisms well known to those skilled in the art.

As calls are switched using the system of FIG. 6, call records are generated on one or more of the first CO switch 612, the second CO switch 614, the tandem switch 604, or the TOPS switch 606. At periodic, repeated, and/or scheduled times, switch polling mechanism 605 polls first CO switch 612, second CO switch 614, tandem switch 604, and TOPS switch 606 to generate call record files containing call records pertaining to one or more of the aforementioned switches. Switch polling mechanism 605 sends these call record files to billing mainframe server 608. DUF files are created as part of a billing process which commences on billing mainframe server 608 using the call record files.

Figure 7:
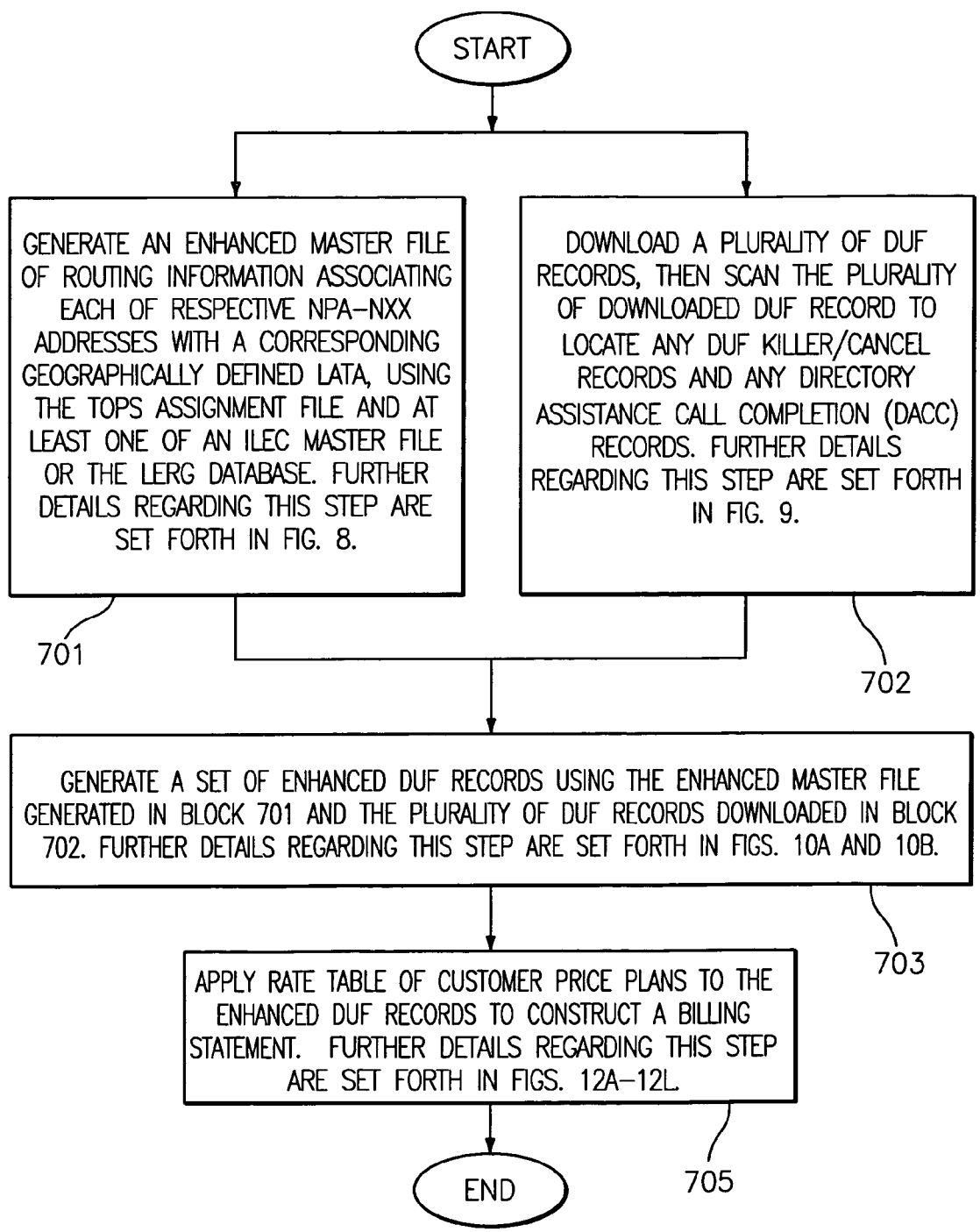
FIG. 7 is a flowchart setting forth methods for constructing a billing statement using daily usage file records according to various illustrative embodiments.

FIG. 7 is flowchart setting forth computer-executable methods for constructing a billing statement using daily usage file records according to various illustrative embodiments. The method could, but need not, be performed at CLEC server 634 (FIG. 6). As used herein, the term "daily usage file (DUF) record" refers to at least one of an ADUF record (FIGS. 2A-2B, 120-124), an ODUF record (FIGS. 4A-4C, 320-328), or an enhanced optional daily usage file (EODUF) record. The operational sequence of FIG. 7 commences at block 701 where an enhanced master file of routing information is generated. The enhanced master file associating each of respective NPA-NXX addresses with a corresponding geographically defined LATA, using a TOPS assignment file from TOPS database 616 (FIG. 6), and at least one of ILEC master file 622 (FIG. 6), or LERG database 630. The enhanced master file includes routing information, as was the case with ILEC master file 622 (discussed above). However, due to the fact that the enhanced master file incorporates information from a variety of sources (i.e., LERG database 630 and/or TOPS database 616), the enhanced master file will contain more accurate information than ILEC master file 622. Further details regarding this step are set forth in FIG. 8, described hereinafter.

The operations of block 702 (FIG. 7) may be performed prior to, after, or concurrently with the performance of block 701. At block 702, a plurality of DUF records are downloaded. The plurality of DUF records are then scanned to locate any DUF killer/cancel records and any directory assistance call completion (DACC) records. Further details regarding this step are set forth in FIG. 9.

Next, at block 703, a set of enhanced DUF records is generated using the enhanced master file generated in block 701 and the plurality of DUF records downloaded in block 702. Further details regarding this step are set forth in FIG. 11. Illustratively, this step is performed by filtering the downloaded records using at least one of: (a) a subsequent DUF killer/cancel record (FIG. 2A, 103, or FIG. 4C, 308 or 309) specifying cancellation of a corresponding earlier DUF record; (b) the respective DUF header record specifying the time period of the file creation, (c) the message date as recorded in each individual DUF record, (d) Q account data identifying a CLEC (i.e., first CLEC 30 or second CLEC 40) that utilized UNE 50, or (e) group rules.

Groups are call classifications. That is, a call from a CLEC customer to directory assistance is considered to be a different call classification than a CLEC customer making a local call to an ILEC customer. There may be dozens of call classifications, wherein each classification has a different set of rate elements that may apply. Group rules specify the manner in which calls of a particular call classification are filtered.

After the operation of block 703 (FIG. 7) is performed, a rate table of customer price plans (i.e., customer price plan and rate table 636, FIG. 6) is applied to the enhanced DUF records of block 703 (FIG. 7) to construct a billing statement (block 705). Further details regarding this step are set forth in FIG. 12.

Figure 8:
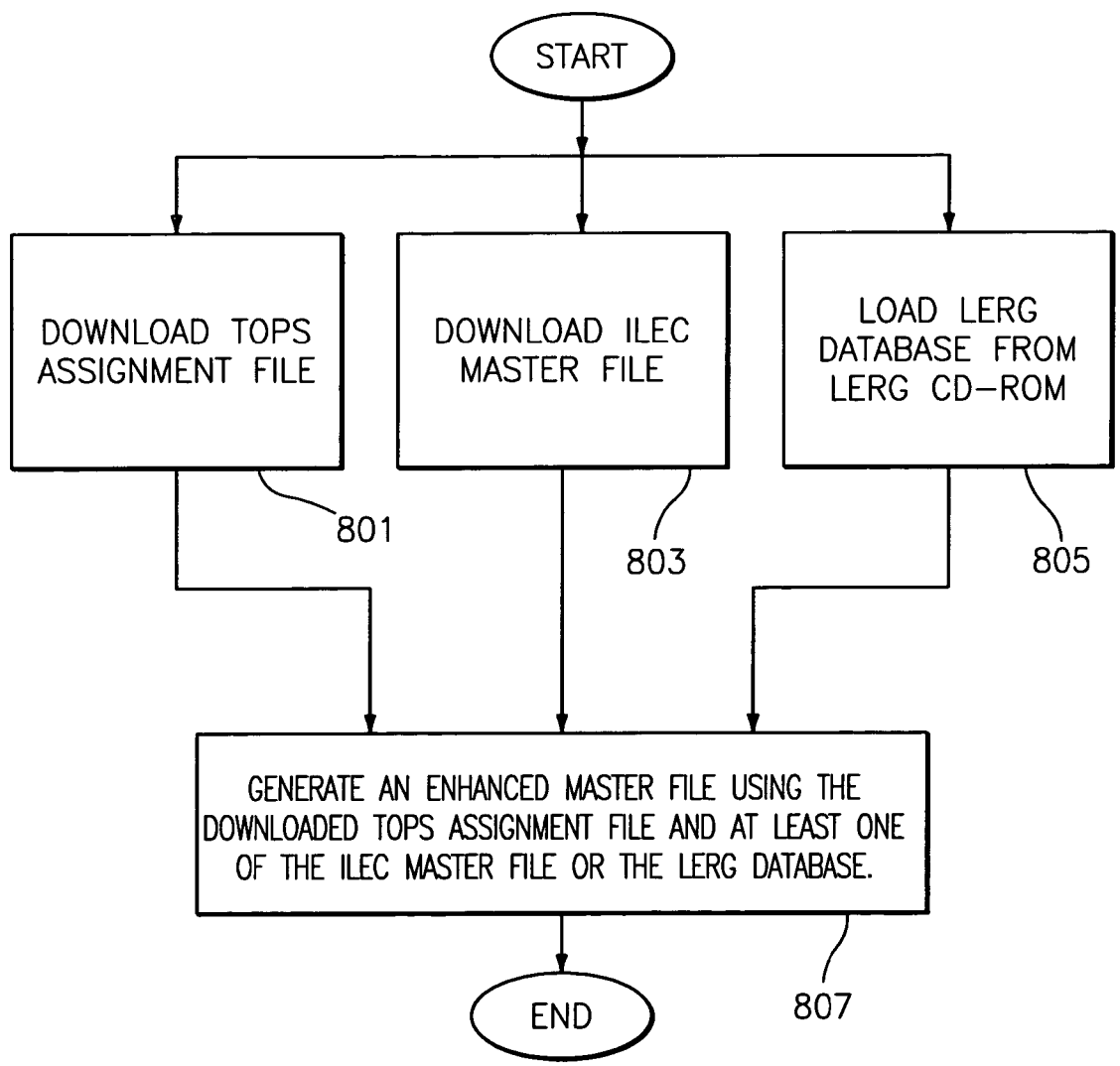
FIG. 8 is a flowchart setting forth methods for generating an enhanced master file for use with the method of FIG. 7.

FIG. 8 is a flowchart setting forth methods for generating an enhanced master file as described in block 701 of FIG. 7. The operations of block 801 (FIG. 8) may be performed prior to, after, or concurrently with the performance of block 803. Likewise, block 803 may be performed before, after, or concurrently with the optional operations of block 805. At block 801, a plurality of TOPS assignment files are downloaded from TOPS database 616 (FIG. 6). A master file (ie, ILEC master file 622 of FIG. 6) is downloaded from an ILEC at block 803 (FIG. 8). At block 805, one or more LERG files are downloaded from LERG CD-ROM 630 (FIG. 6) which contains a LERG database. Steps 801, 803, and 805 can be performed concurrently and/or at different times. Next, using the downloaded TOPS assignment files and at least one of the ILEC master file or the LERG files, the master file is edited, thereby generating an enhanced master file (FIG. 8, block 807).

Figure 9:
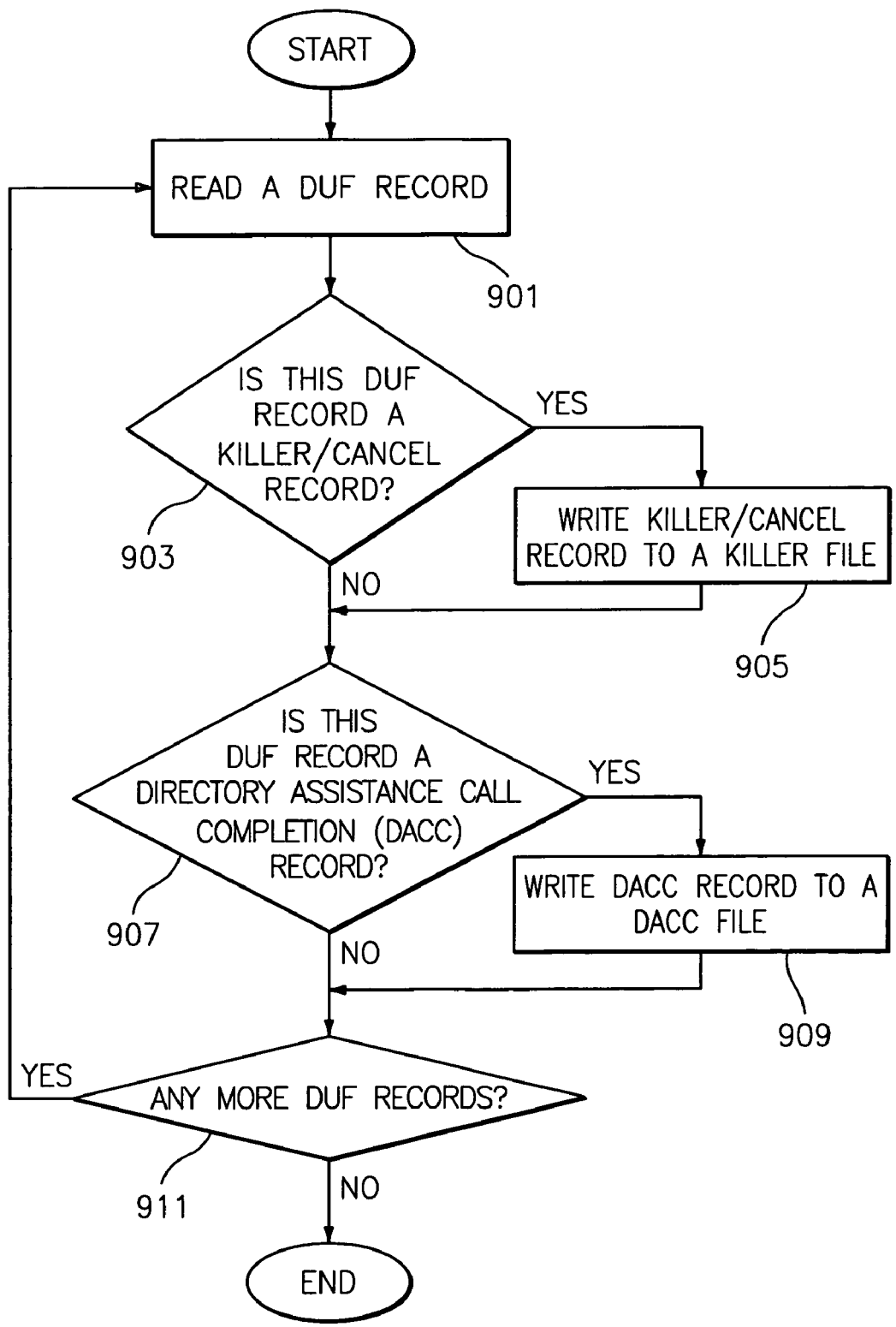
FIG. 9 is a flowchart describing an illustrative procedure for filtering daily usage file records using killer/cancel records in accordance with the methods of FIG. 7.

FIG. 9 is a flowchart describing an illustrative procedure for filtering DUF records using killer/cancel records in accordance with block 703 of FIG. 7. The operational sequence of FIG. 9 commences at block 901 where a DUF record is read. At block 903, a test is performed to ascertain whether or not the DUF record read at block 901 is a killer/cancel record. If not, the program advances to block 907. The affirmative branch from block 903 leads to block 905 where the killer/cancel record is written to a killer file. The program then advances to block 907.

At block 907, a test is performed to determine whether or not the DUF record read at block 901 is a directory assistance call completion (DACC) record. If not, the program advances to block 911. The affirmative branch from block 907 leads to block 909 where the DACC record is written to a DACC file. The program then advances to block 911. At block 911, a test is performed to determine whether or not there are any remaining DUF records. If so, the program loops back to block 901. Otherwise, the program terminates.

Figure 10A:
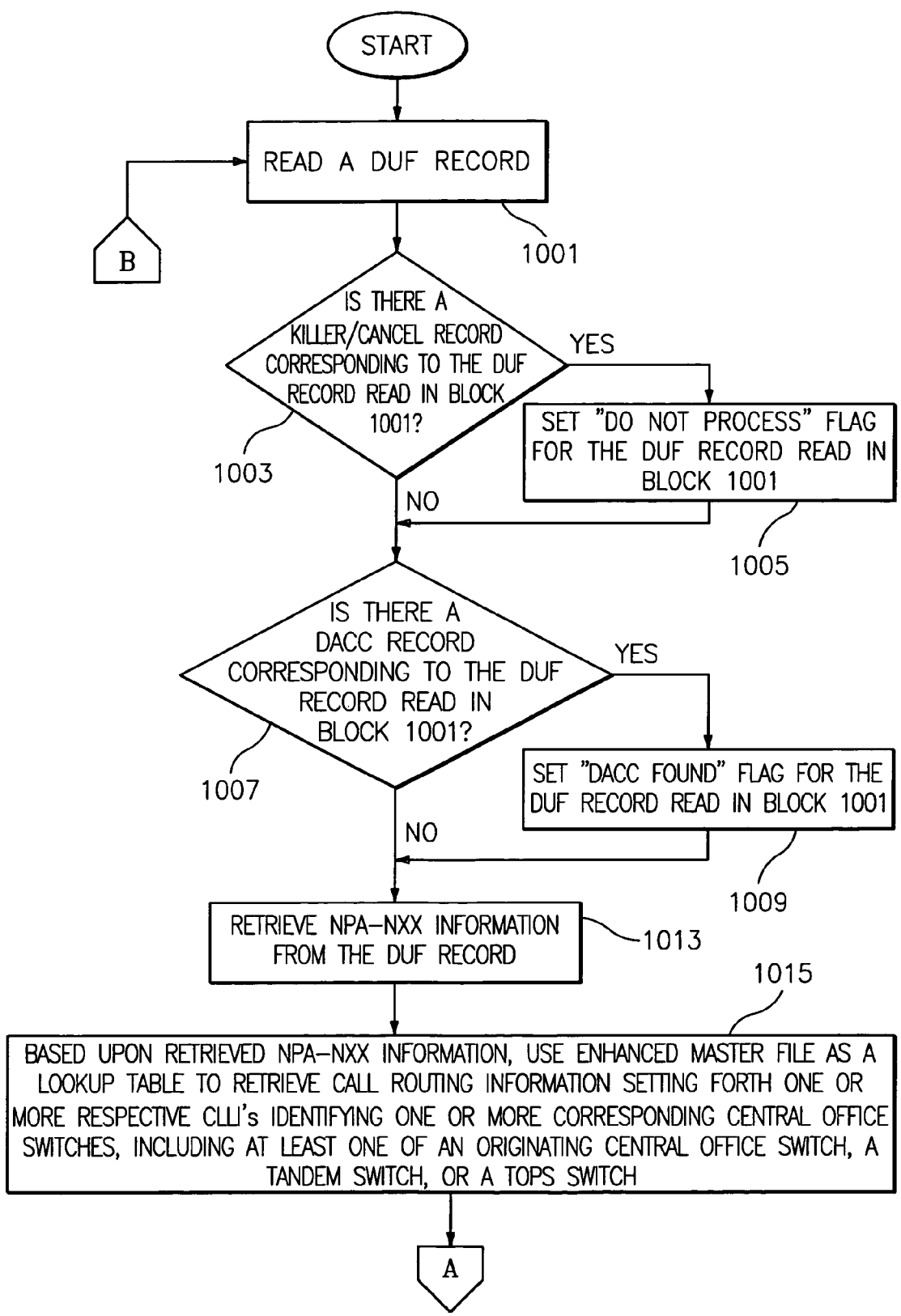
FIGS. 10A and 10B together comprise a flowchart describing illustrative procedures for filtering daily usage file records to determine which records will be included on a bill in accordance with the methods of FIG. 7.
Figure 10B:
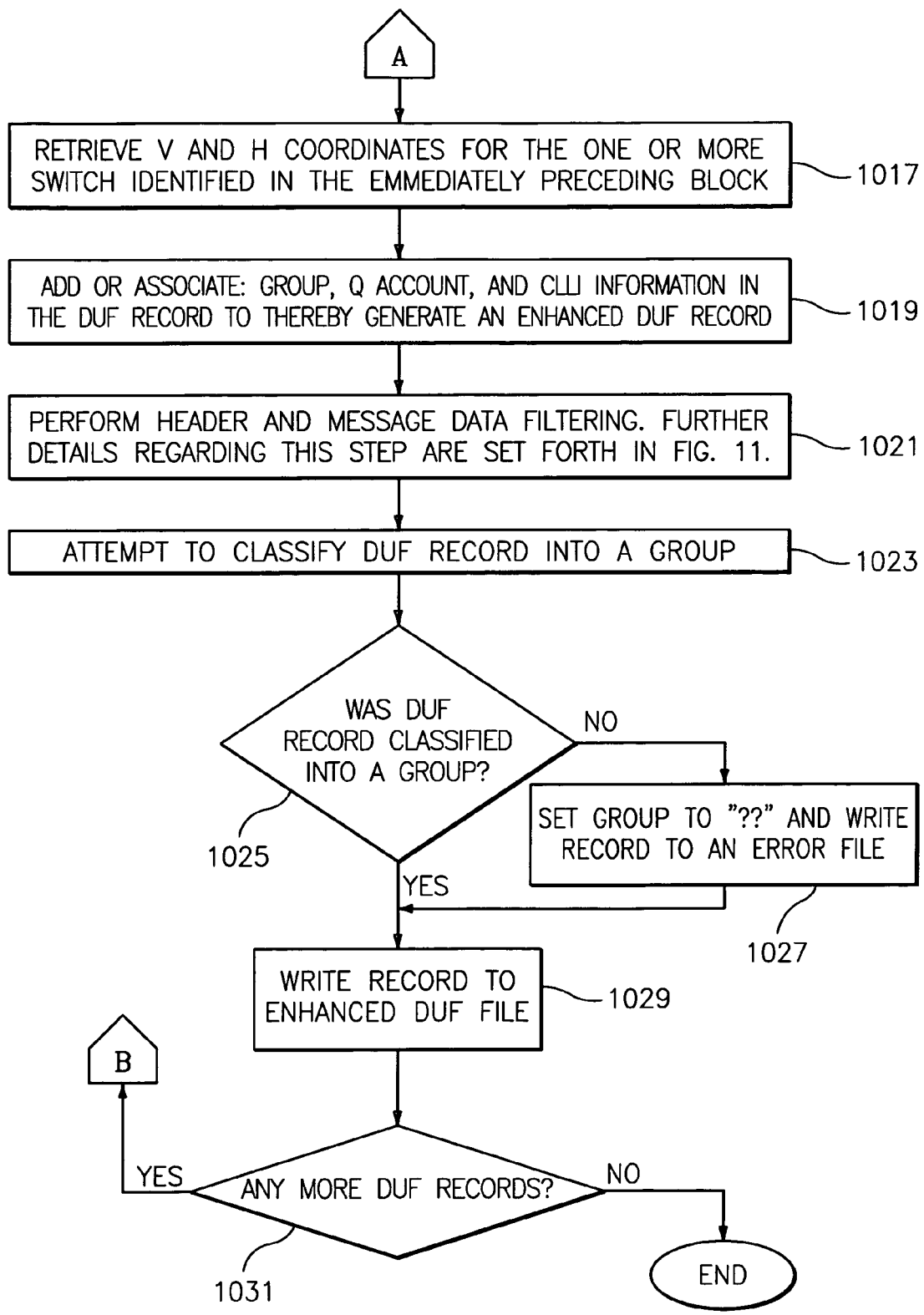

FIGS. 10A and 10B together comprise a flowchart describing illustrative procedures for filtering daily usage file records to determine which records will be included on a bill in accordance with the methods of FIG. 7. The operational sequence of FIG. 10 commences at block 1001 where a DUF record is read. At block 1003, a test is performed to determine whether or not there is a killer/cancel record corresponding to the DUF record read at block 1001. If not, the program continues to block 1007 (described hereinafter). The affirmative branch from block 1003 leads to block 1005 where a "do not process" flag is set for the DUF record read at block 1005. The program then continues to block 1007.

At block 1007, a test is performed to ascertain whether there is a DACC record corresponding to the DUF record read at block 1001. If not, the program continues to block 1013 (described hereinafter). The affirmative branch from block 1007 leads to block 1009 where a "DACC found" flag is set for the DUF record read at block 1001. The program then continues to block 1013.

At block 1013, NPA-NXX information is retrieved from the DUF record. Based upon the retrieved NPA-NXX information, the enhanced master file is used as a lookup table to retrieve call routing information setting forth one or more Common Language Identifiers (CLLIs) identifying one or more central office switches, including at least one of an originating central office switch, a tandem switch, or a TOPS switch (block 1015). At block 1017, vertical (V) and horizontal (H) coordinates (or latitude and longitude) are retrieved for the one or more switches identified in the immediately preceding block. Group, Q account, and CLLI information is added to or associated with the DUF record to thereby generate an enhanced DUF record (block 1019). Header and message data filtering of the enhanced DUF records is then performed (block 1021). Further details regarding the operations of block 1021 are described with reference to FIG. 11.

At block 1023 of FIG. 10B, an attempt is made to classify the enhanced DUF record into a group. Groups are call classifications. That is, a call from a CLEC customer to directory assistance is considered to be a different call classification than a CLEC customer making a local call to an ILEC customer. There may be dozens of call classifications, wherein each classification has a different set of rate elements that may apply. Group rules specify the manner in which calls of a particular call classification are filtered. Next, at block 1025, a test is performed to determine whether or not the enhanced DUF record was classified into a group at block 1023. If so, the program advances to block 1029. The negative branch from block 1025 leads to block 1027 where a group identification parameter is set to "??" and the DUF record is written to an error file. The program then advances to block 1029.

At block 1029, the DUF record is written to an enhanced DUF file. Then, at block 1031, a test is performed to determine whether or not there are any remaining DUF records to be processed. If so, the program loops back to block 1001 (FIG. 10A). Otherwise, the program terminates.

Figure 11:
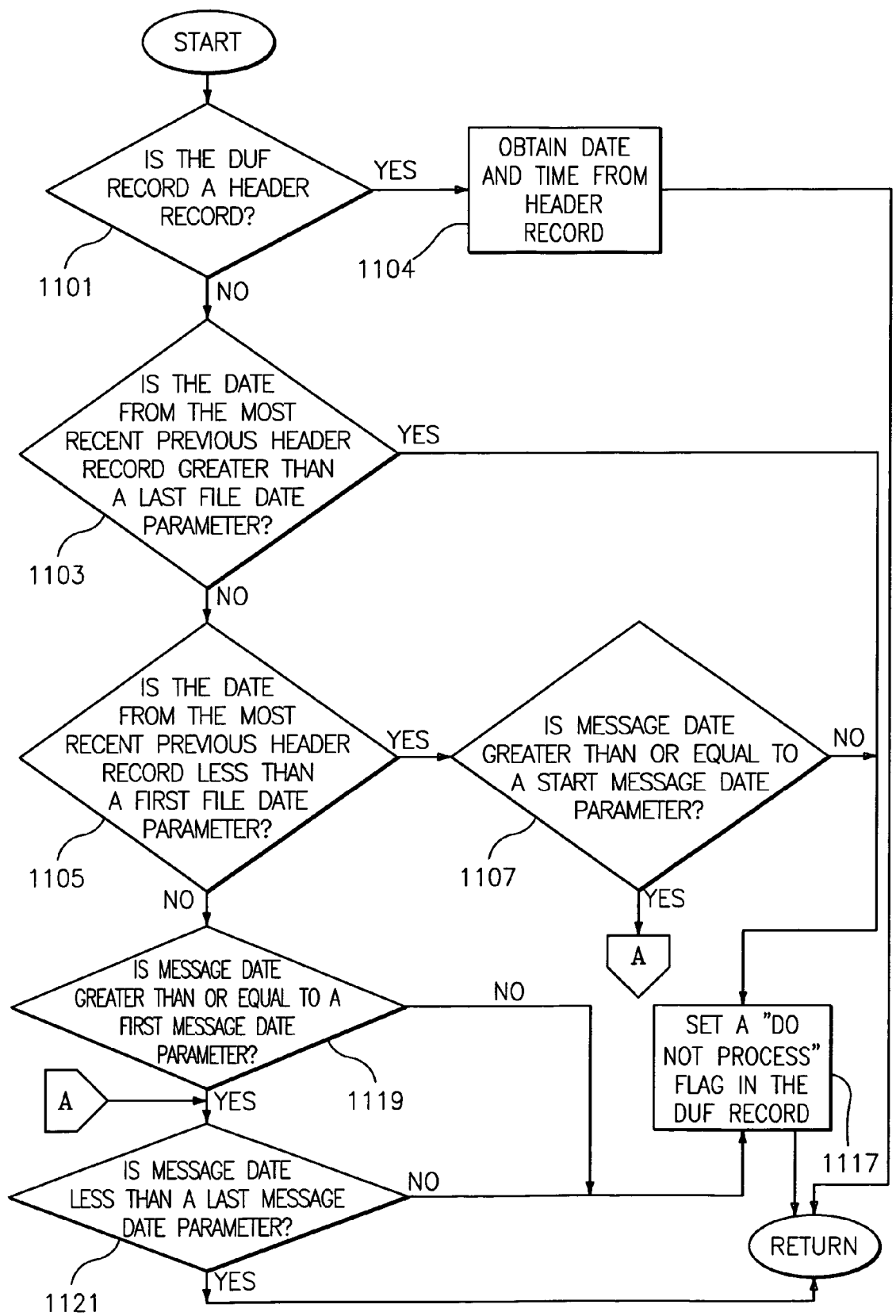
FIG. 11 is a flowchart describing illustrative procedures for performing header and message data filtering of daily usage file records in accordance with the procedures of FIGS. 10A and 10B.

FIG. 11 is a flowchart describing illustrative procedures for performing header and message data filtering of daily usage file records in accordance with the procedures of FIGS. 10A and 10B. The operational sequence commences at block 1101 where a test is performed to ascertain whether or not a DUF record is a header record. If so, a date and a time are obtained from the header record (block 1104), and the operational sequence returns to FIG. 10B (block 1023). The negative branch from block 1101 leads to block 1103 where a test is performed to ascertain whether or not the date from the most recent previous header record is greater than a last file date parameter. If so, the program advances to block 1117 where a "do not process" flag is set in the DUF record and the operational sequence returns to FIG. 10B (block 1023).

The negative branch from block 1103 leads to block 1105 where a test is performed to ascertain whether or not the date from the most recent previous header record is less than a first file date parameter. If so, the program advances to block 1107 where a test is performed to ascertain whether or not the message date is greater than or equal to a start message date parameter. If not, a "do not process" flag is set in the DUF record (block 1117), and the program returns to FIG. 10B (block 1023). The affirmative branch from block 1107 leads to block 1121 (to be described hereinafter).

The negative branch from block 1105 leads to block 1119 where a test is performed to determine whether the message date is greater than or equal to a first message date parameter. If not, the program advances to block 1117 (described previously). The affirmative branch from block 1119 leads to block 1121 where a test is performed to determine whether or not the message date is less than the last message date parameter. If not, the program advances to block 1117 (described above). The affirmative branch from block 1121 returns back to block 1023 of FIG. 10B.

FIGS. 12A-12L together comprise a flowchart for applying a rate table of customer price plans to an enhanced master file and a plurality of detailed usage file records filtered in accordance with any of the methods described in FIGS. 9-11. FIGS. 12A-12L also represent an illustrative implementation of block 705 of FIG. 7. The operational sequence of FIGS. 12A-12L commences at block 1201 (FIG. 12A) where a rate table of customer price plans (i.e, customer price plan and rate table 636, FIG. 6) is downloaded. At block 1203 (FIG. 12A), the date of the bill that is to be constructed is determined, specified, or selected. Using the date of the bill that is to be constructed (block 1205), the previous N bill dates are computed, where N is an integer between 2 and 8 inclusive and, in an illustrative embodiment, is equal to 5.

Figure 12A:
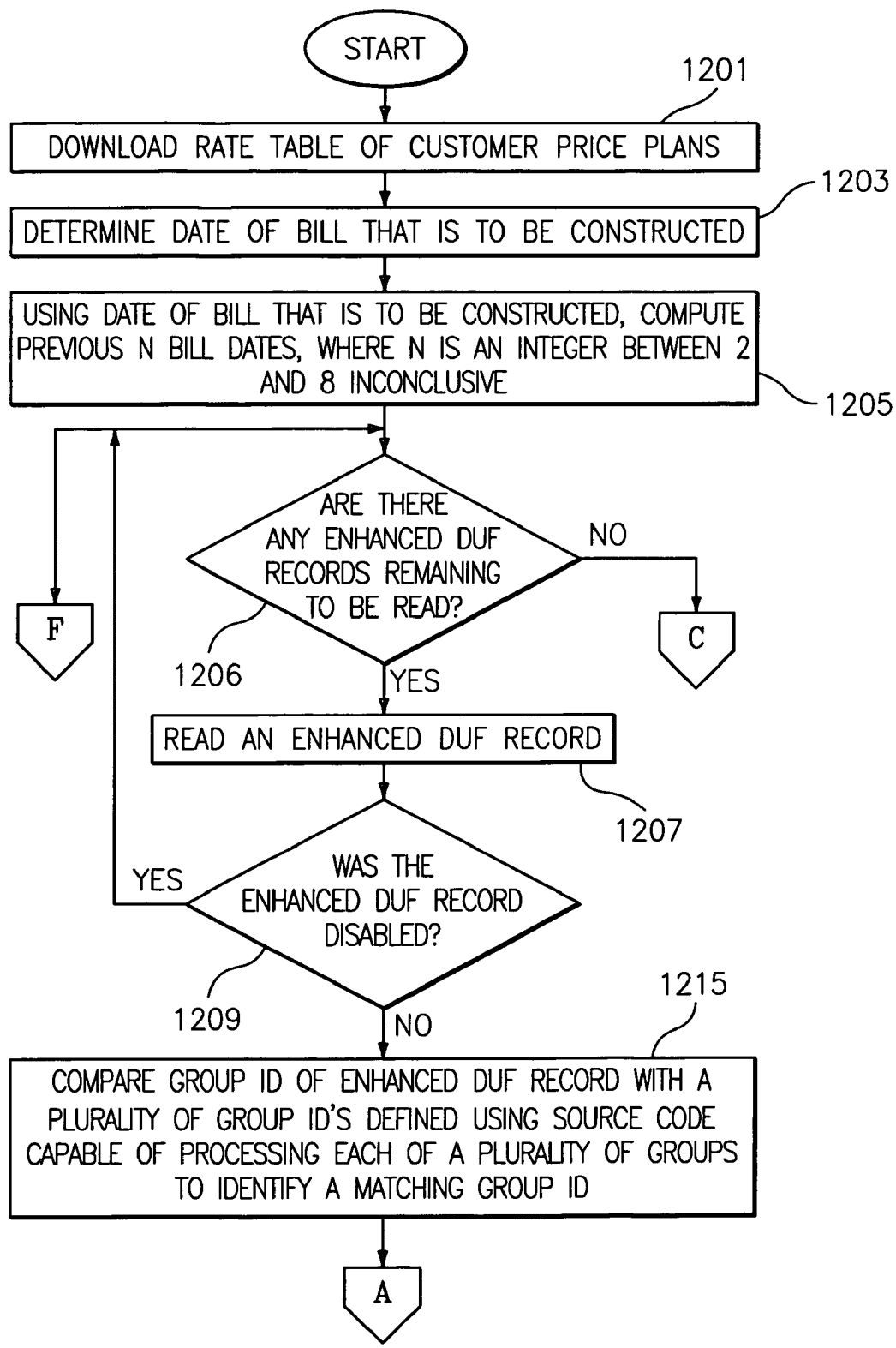
FIGS. 12A-12L together comprise a flowchart for applying a rate table of customer price plans to an enhanced master file and a plurality of detailed usage file records filtered in accordance with any of the methods described in FIGS. 9-11.
Figure 12B:
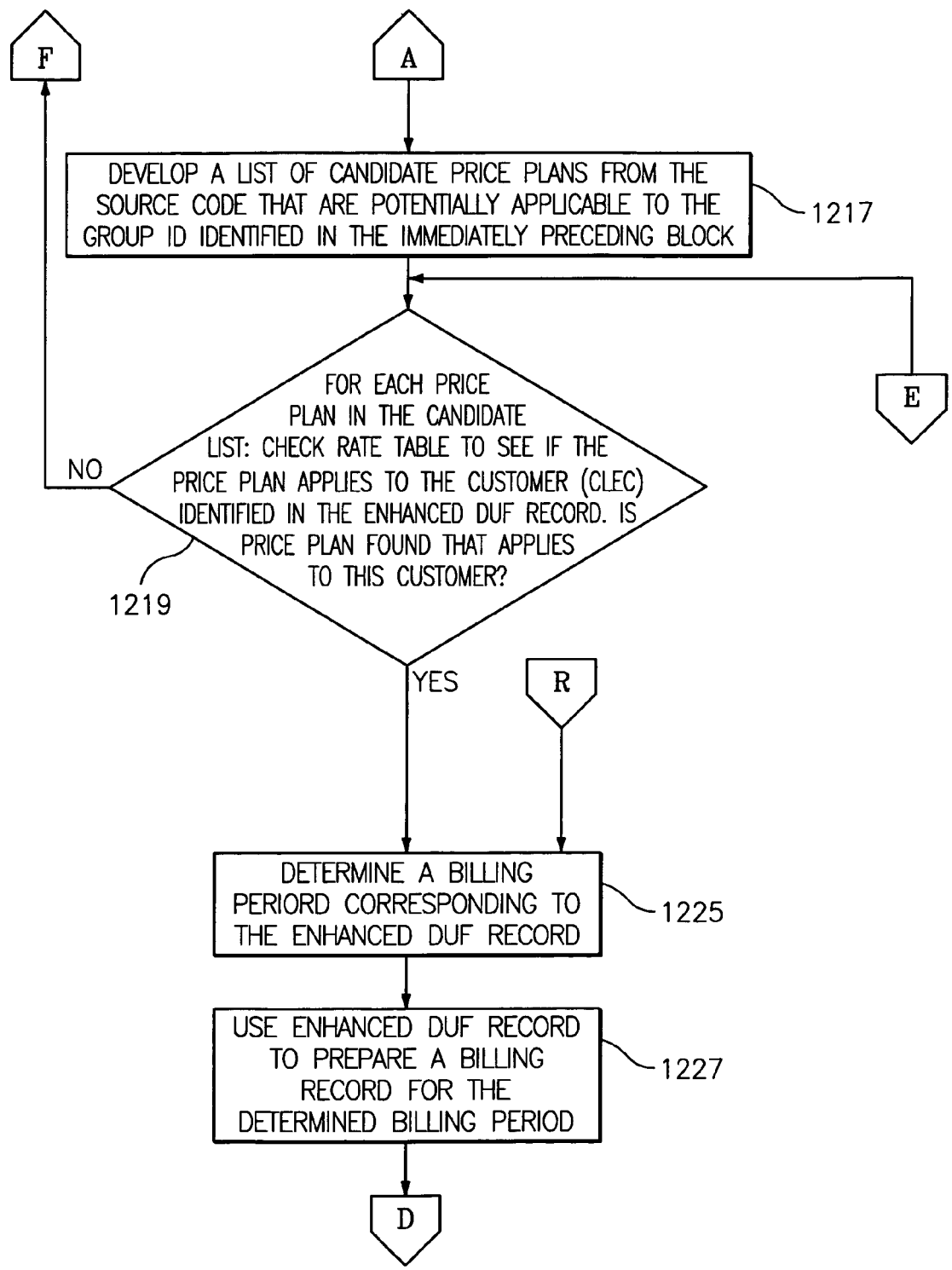
Figure 12C:
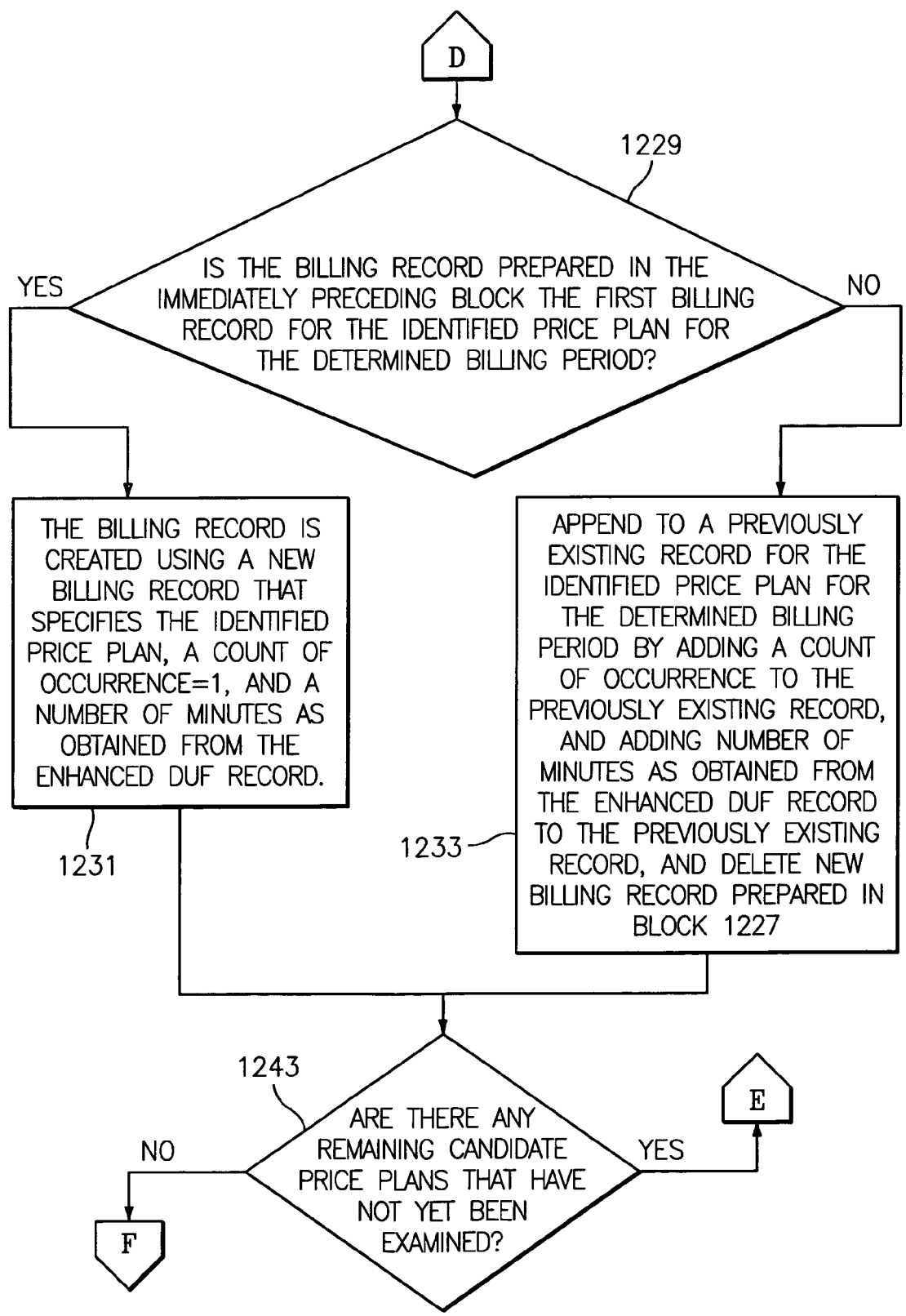
Figure 12D:
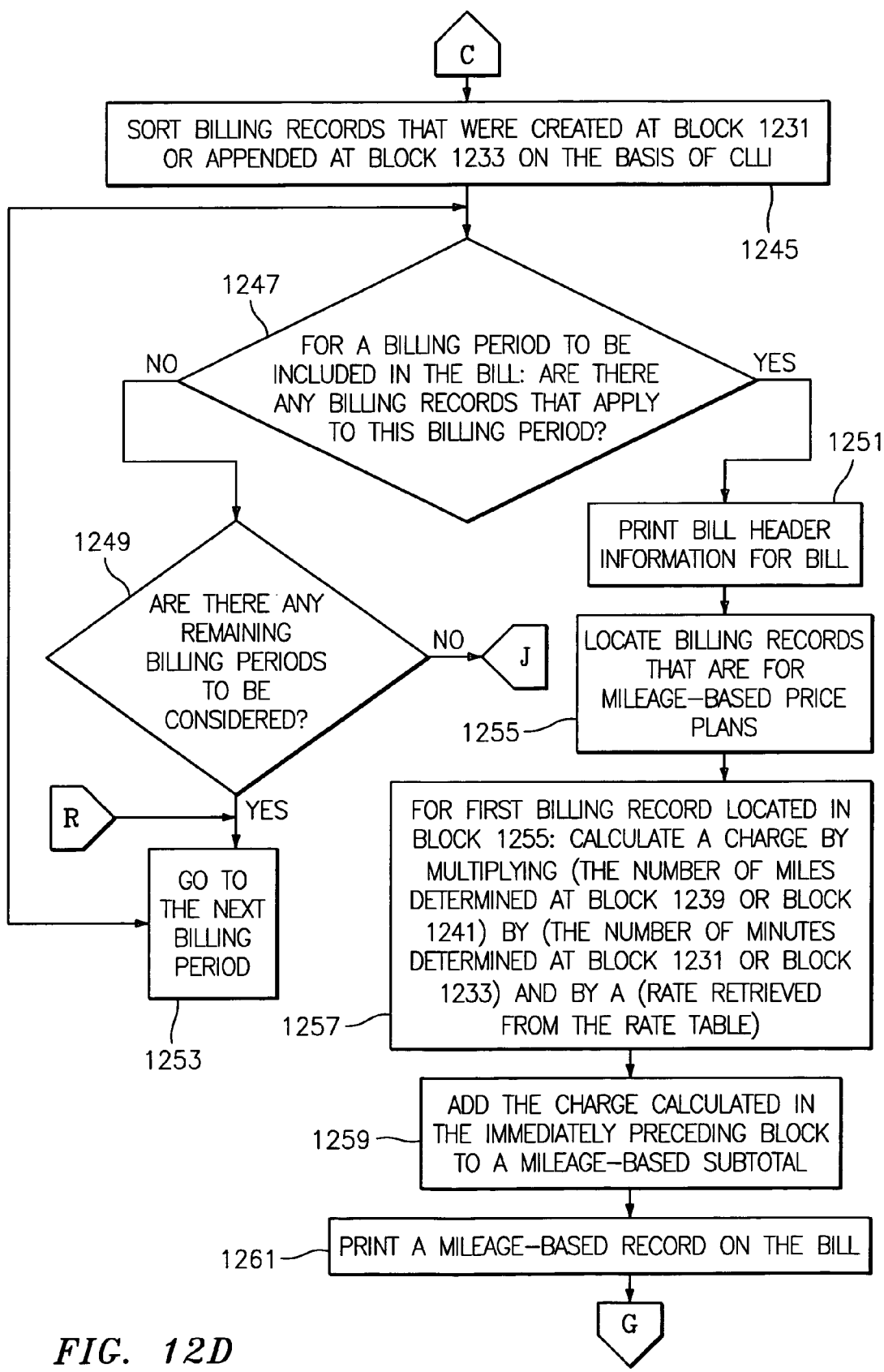
Figure 12E:
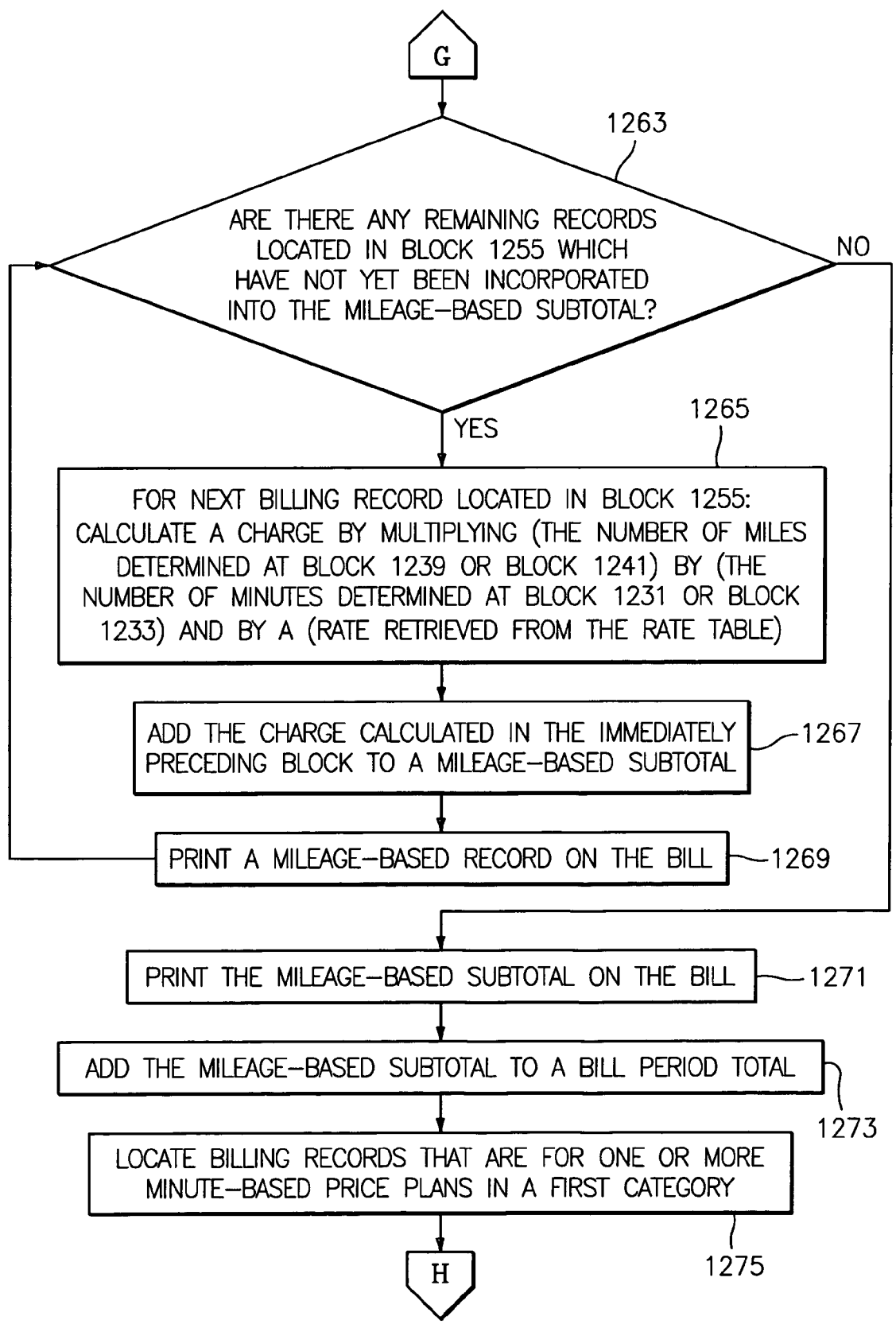
Figure 12F:
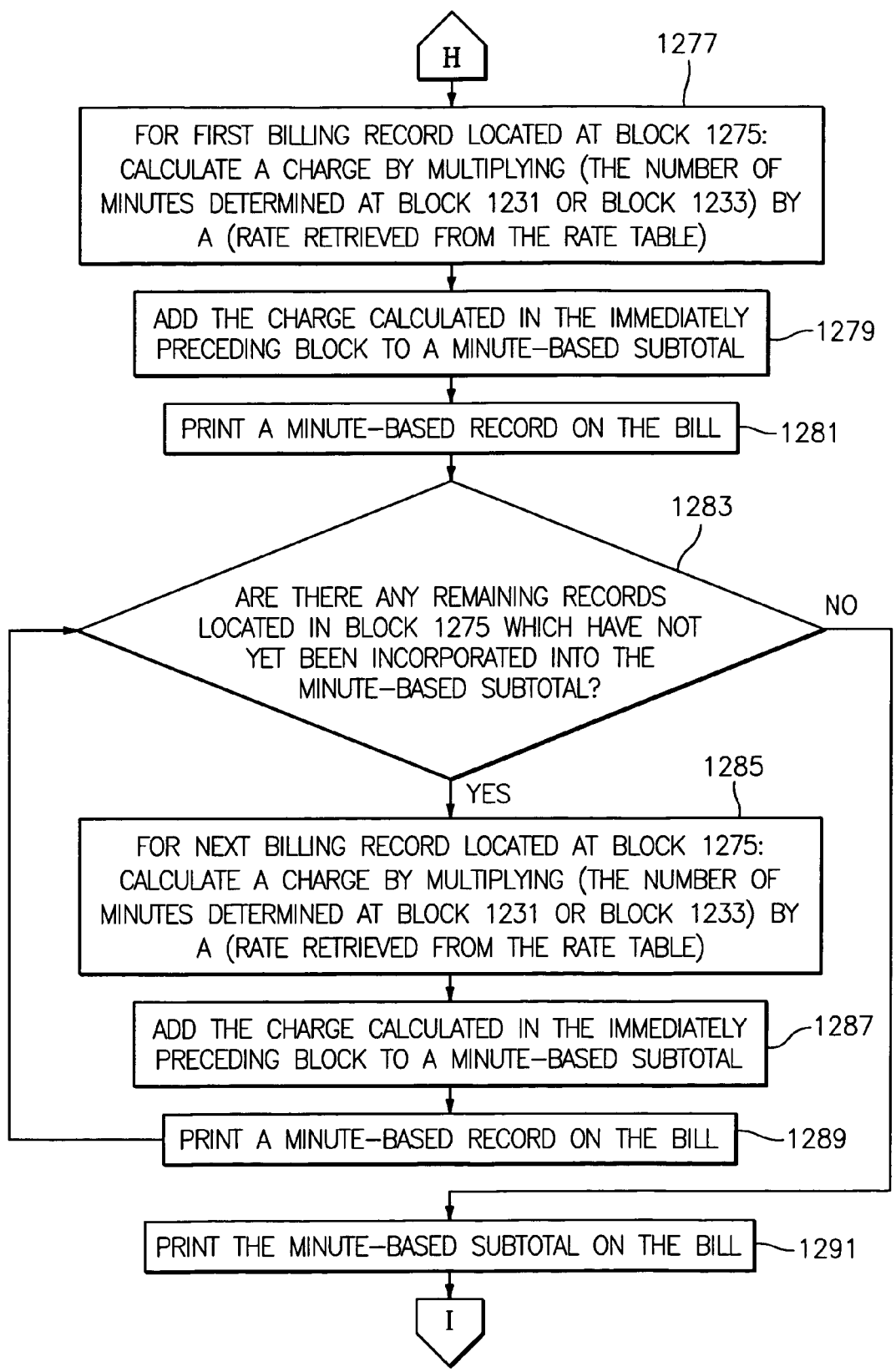

At block 1206, a test is performed to ascertain whether or not there are any enhanced DUF records remaining to be read. If not, the program advances to block 1245 (FIG. 12D). The affirmative branch from block 1206 leads to block 1207 where an enhanced DUF record is read. A test is performed (block 1209) to determine whether or not this first enhanced DUF record was disabled. If so, the program loops back to block 1206 (described above). The negative branch from block 1209 leads to block 1215 where the group ID of the enhanced DUF record is compared with a plurality of group ID's defined using source code capable of processing each of a plurality of groups to identify a matching group ID (block 1215). An illustrative example of source code is:

else if (strcmp(group, "D2a")=0{
    UpdateMileage ("0UST3", Mileage(ORIG,TANDEM), duration, oc,
      TANDEM_CLLI);
    UpdatePricePlan("0UFT4", duration, oc);
    UpdatePricePlan("0UTS1", duration, oc);
    UpdatePricePlan("0UTP1", duration, oc);
    UpdatePricePlan("0ULS2", duration, oc);

In the foregoing example, the source code checks to see if group "D2a" is being processed. If so, the mileage-based price plan "0UST3" is updated as well as the minute-based price plans "0UFT4", "0UTS1", "0UTP1", and "0ULS2". Similar code is provided to process each of a plurality of additional groups.

Next, at block 1217, a list of candidate price plans that are potentially applicable to the group identified in the immediately preceding block is developed from the source code. For each price plan in the candidate list, a rate table is checked to see if the price plan applies to the customer (CLEC) identified in the enhanced DUF record (block 1219). A test is performed to ascertain whether or not a price plan is found that applies to this customer. If no more price plans are found that apply to this customer, the program loops back to block 1206. If a price plan is found that applies to this customer, the program advances to block 1225.

At block 1225, a billing period corresponding to the enhanced DUF record is determined. The enhanced DUF record is used to prepare a billing record for the determined billing period (block 1227). At block 1229, a test is performed to ascertain whether or not the billing record prepared in the immediately preceding block is the first billing record for the identified price plan for the determined billing period. If not, the program advances to block 1233 where a previously existing record for the identified price plan is appended by adding a count of occurrence to the previously existing record, and by adding a number of minutes as obtained from the enhanced DUF record to the previously existing record. The new billing record that was prepared in block 1227 is deleted, and the program advances to block 1243 (described hereinafter).

The affirmative branch from block 1229 leads to block 1231 where the billing record is created using a new billing record that specifies the identified price plan, a count of occurrence=1, and a number of minutes as obtained from the enhanced DUF record. The program advances to block 1243 where a test is performed to ascertain whether or not there are any remaining candidate price plans for which billing records have not yet been created. If so, the program loops back to block 1219 (FIG. 12B). The negative branch from block 1243 leads to block 1206 (FIG. 12A), discussed above.

The negative branch from block 1206 leads to block 1245 (FIG. 12D) where billing records that were created at block 1231 (FIG. 12C) or appended at block 1233 are sorted on the basis of each of a plurality of billing periods. At block 1247, for each of one or more billing periods to be included in the billing statement, a test is performed to determine whether there are any billing records that apply to this billing period. If not, the program advances to block 1249 where a test is performed to ascertain whether or not there are any remaining billing periods to be considered. If not, the program terminates. The affirmative branch from block 1249 leads to block 1253 where the next billing period is considered. The program then loops back to block 1247.

The affirmative branch from block 1247 leads to block 1251 where bill header information is printed for the billing statement (the billing statement is also referred to herein simply as a "bill"). Billing records that are for mileage based price plans are located at block 1255. At block 1257, for the first billing record located in block 1255, a charge is calculated by multiplying (the number of miles determined at block 1239 or 1241) by (the number of minutes determined at block 1231 or 1233) and by (a rate retrieved from the rate table). The charge calculated in block 1257 is then added to a mileage-based subtotal (block 1259). A mileage-based subtotal is printed on the bill (block 1261). At block 1263, a test is performed to ascertain whether or not there are any remaining records located in block 1255 which have not yet been incorporated into the mileage-based subtotal. If not, the program advances to block 1271 (to be described hereinafter).

The affirmative branch from block 1263 leads to block 1265 where, for the next billing record located in block 1255, a charge is calculated by multiplying (the number of miles determined at block 1239 or 1241) by (the number of minutes determined at block 1231 or 1233) and by (a rate retrieved from the rate table). The charge calculated in the immediately preceding block is added to a mileage-based subtotal (block 1267), and a mileage-based record is printed on the bill (block 1269). The program then loops back to block 1263.

The negative branch from block 1263 leads to block 1271 where the mileage-based subtotal is printed on the bill. The mileage-based subtotal is added to a bill period total (block 1273). Next, billing records that are for one or more minute-based price plans in a first category are located (block 1275). At block 1277, for the first billing record located at block 1275, a charge is calculated by multiplying (the number of minutes determined at block 1231 or 1233) by (a rate retrieved from the rate table). The charge calculated in the immediately preceding block is added to a minute-based subtotal (block 1279). A minute-based record is printed on the bill (block 1281). At block 1283, a test is performed to determine whether or not there are any remaining records located in block 1275 which have not yet been incorporated into the minute-based subtotal. If not, the program advances to block 1291 (to be described hereinafter). The affirmative branch from block 1283 leads to block 1285 where, for the next billing record located in block 1275, a charge is calculated by multiplying (the number of minutes determined at block 1231 or 1233) by (a rate retrieved from the rate table). The charge calculated in the immediately preceding block is added to the minute-based subtotal (block 1287). A minute-based record is printed on the bill (block 1289), and the program loops back to block 1283.

The negative branch from block 1283 leads to block 1291 where the minute-based subtotal is printed on the bill. The minute-based subtotal is added to a bill period total (block 1293). At block 1295, a test is performed to ascertain whether or not there are any billing records for one or more minute-based price plans in an Nth category, N being a positive integer greater than one. If not, the program advances to block 1315 (described hereinafter). The affirmative branch from block 1295 leads to block 1297 where billing records pertaining to minute-based price plans in the Nth category are located. For the first billing record located in block 1297, a charge is calculated by multiplying (the number of minutes determined at block 1231 or 1233) by (a rate retrieved from the rate table). At block 1301, the charge calculated in the immediately preceding block is added to the minute-based subtotal. A minute-based record is printed on the bill (block 1302).

Figure 12G:
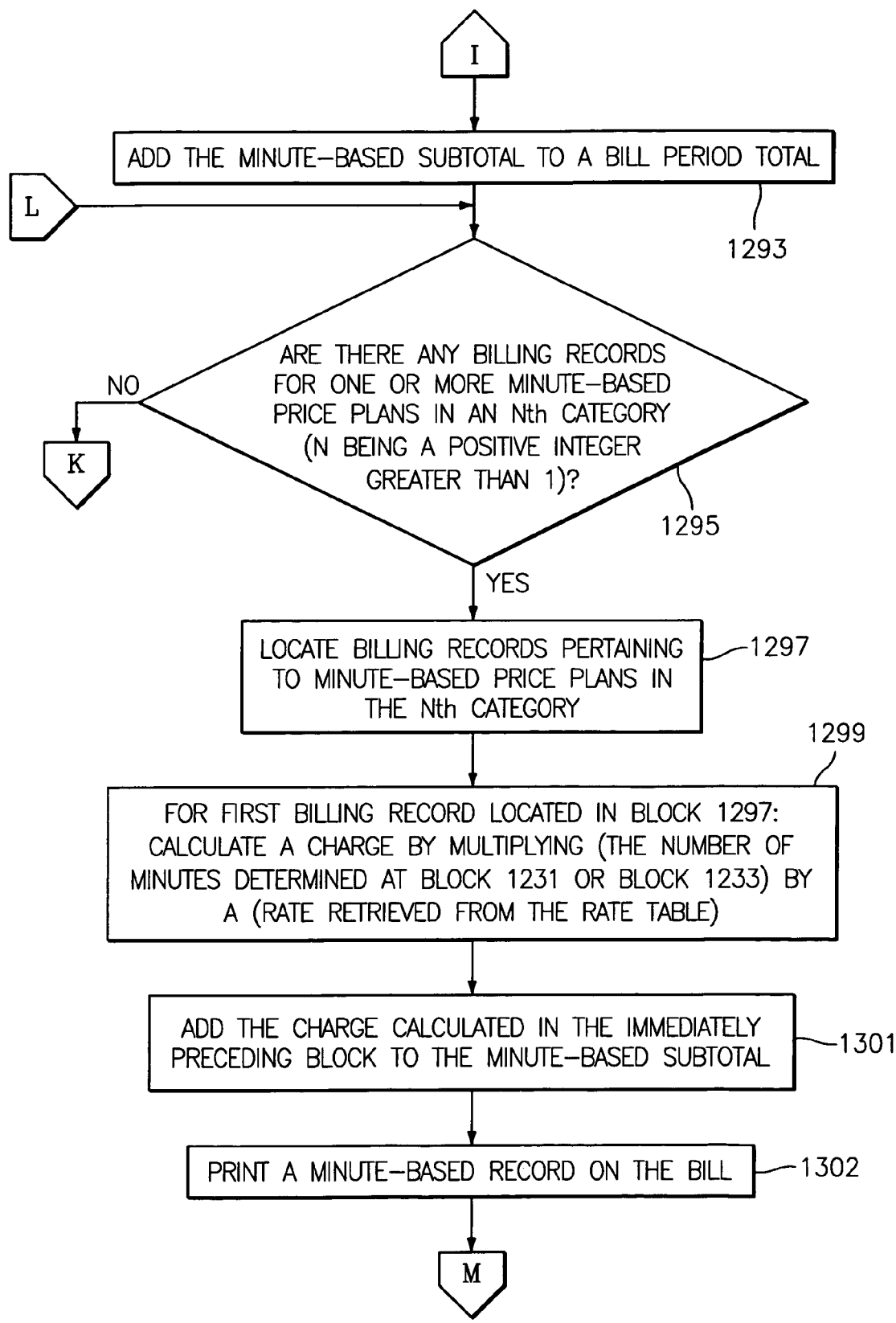
Figure 12H:
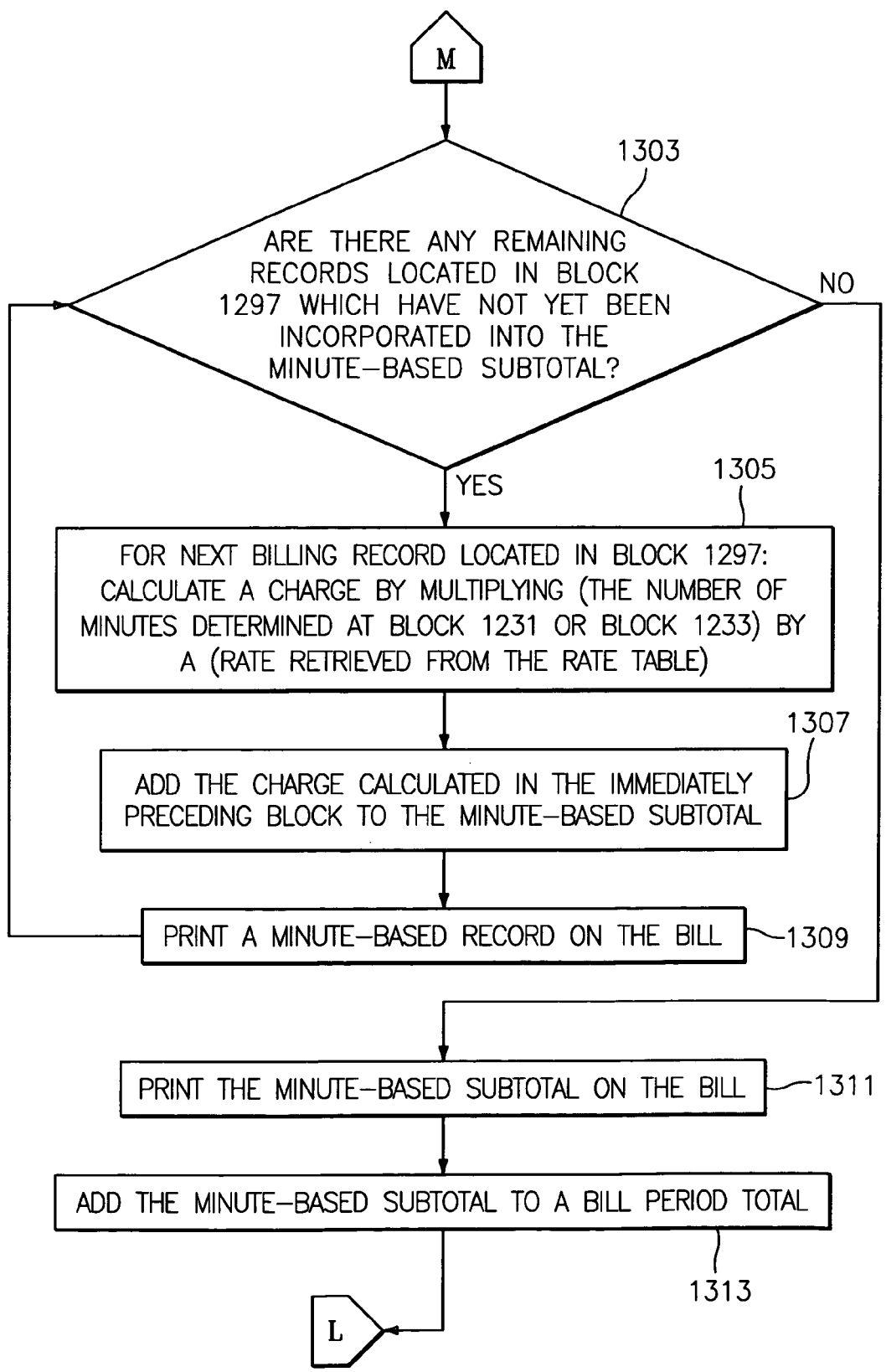
Figure 12I:
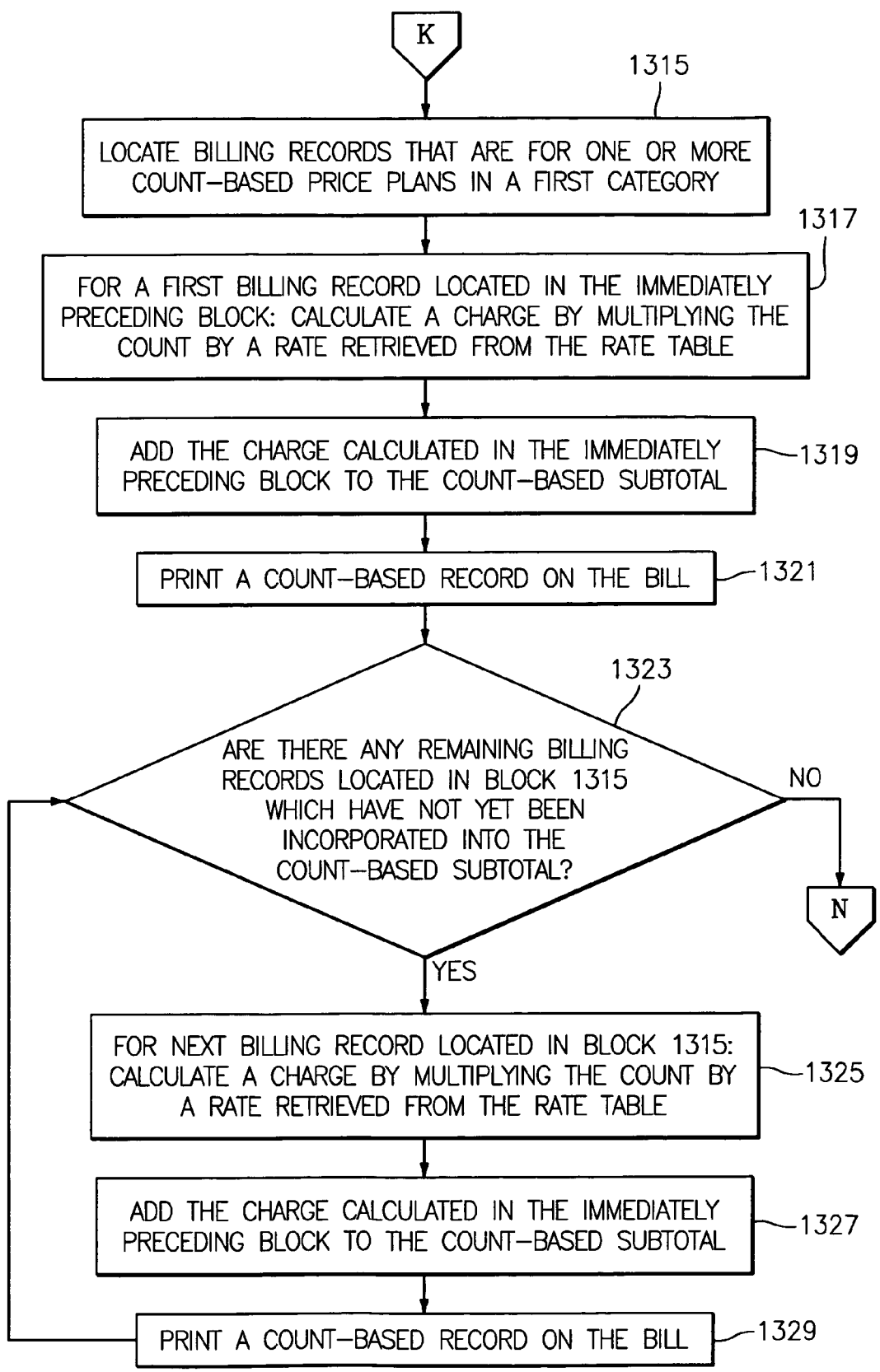
Figure 12J:
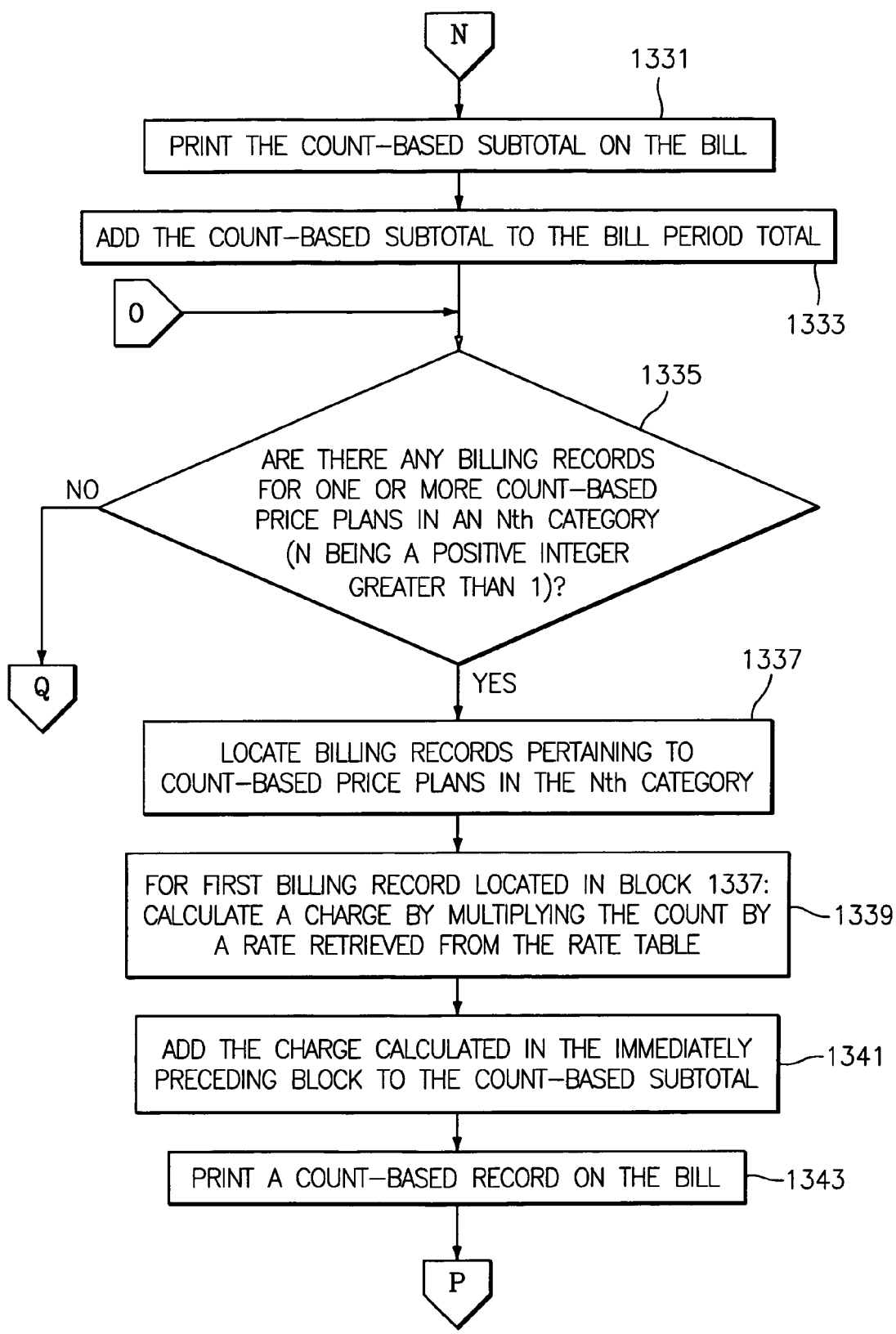
Figure 12K:
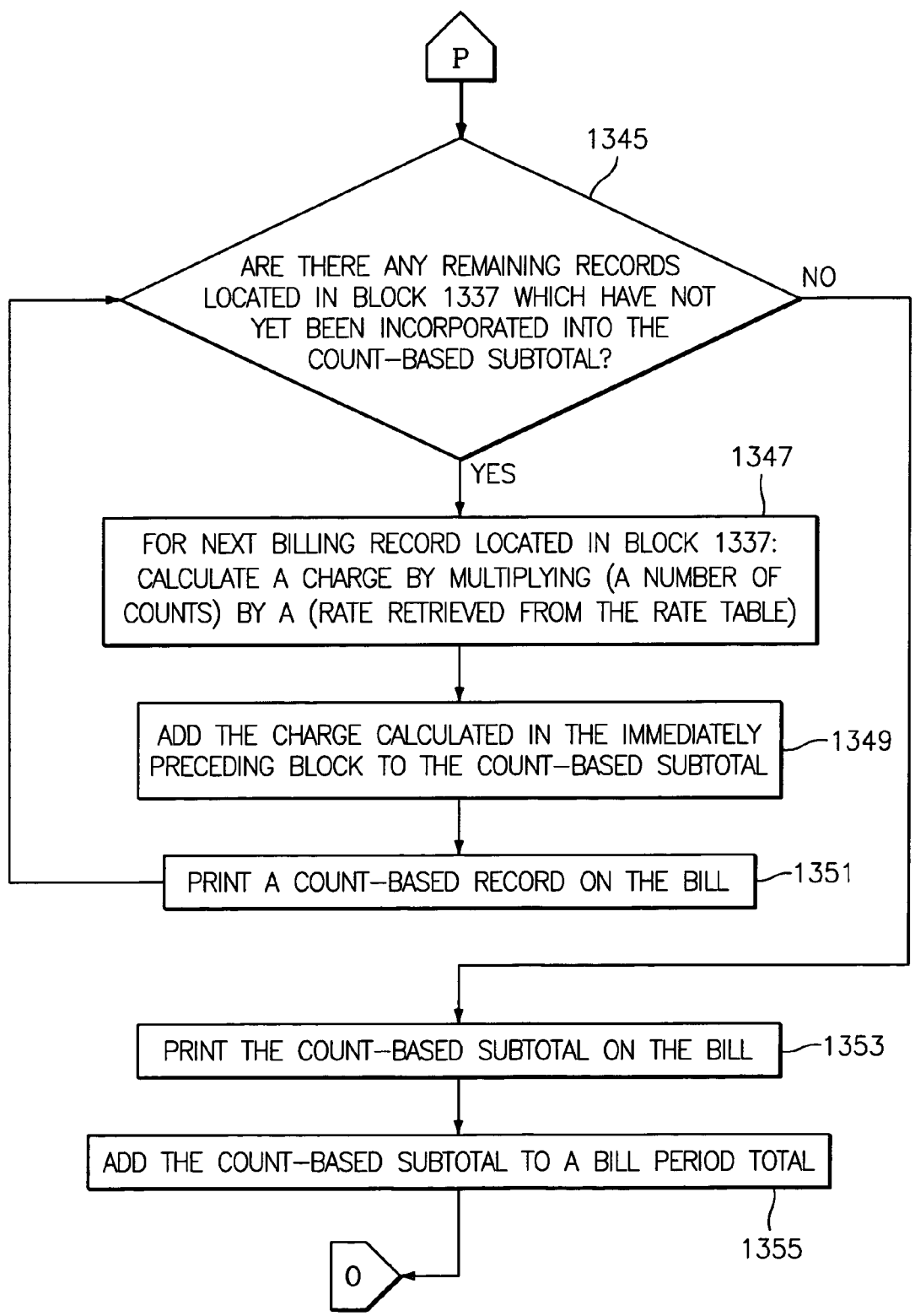
Figure 12L:
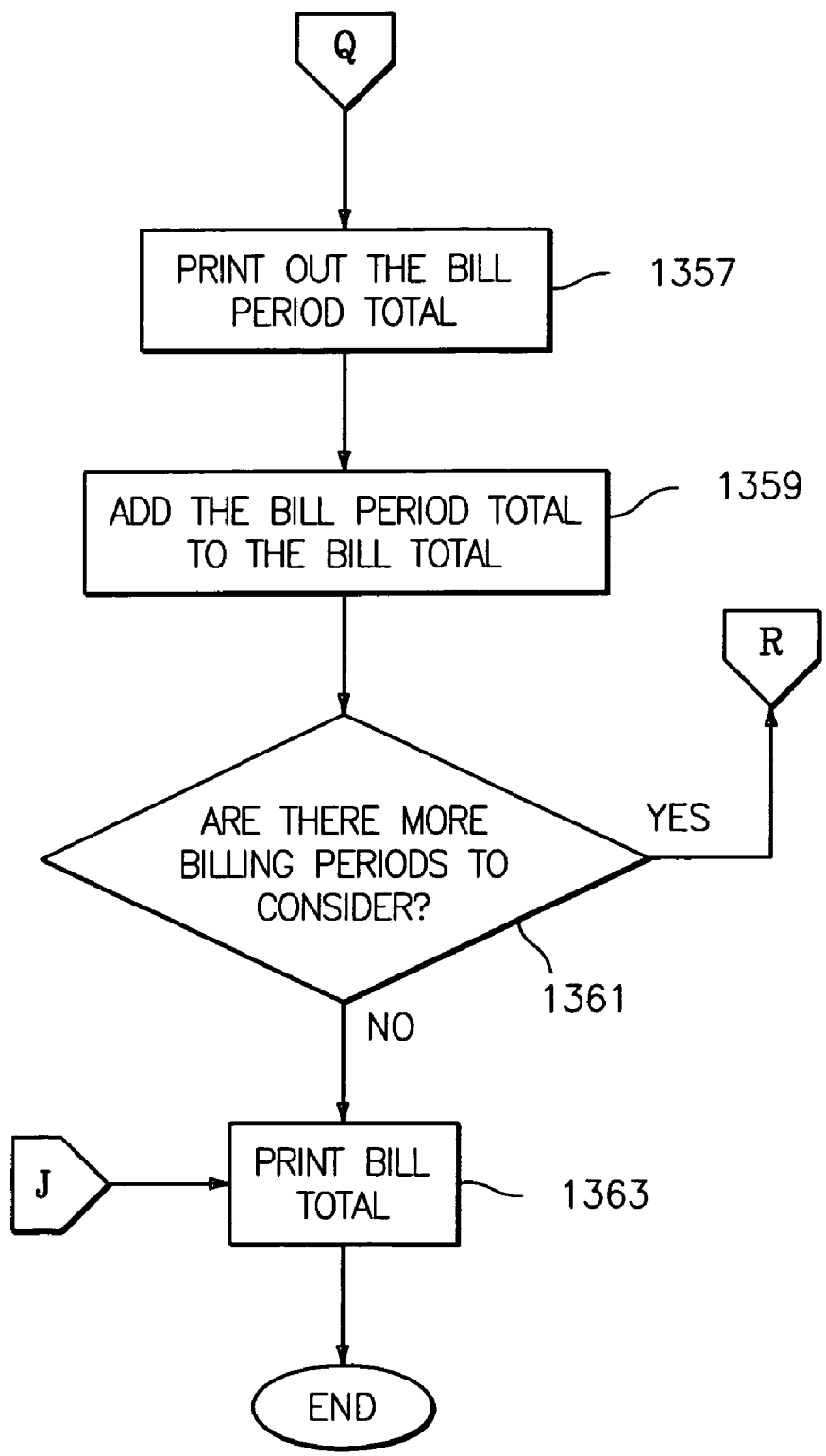

At block 1303, a test is performed to ascertain whether or not there are any remaining records located in block 1297 which have not yet been incorporated into the minute-based subtotal. The negative branch from block 1303 leads to block 1311 (to be described hereinafter). The affirmative branch from block 1303 leads to block 1305 where, for the next billing record located in block 1297, a charge is calculated by multiplying (the number of minutes determined at block 1231 or 1233) by (a rate retrieved from the rate table). The charge calculated in the immediately preceding block is added to the minute-based subtotal (block 1307). A minute-based record is printed on the bill (block 1309), and the program loops back to block 1303. The negative branch from block 1303 leads to block 1311 where the minute-based subtotal is printed on the bill. The minute-based subtotal is added to a bill period total (block 1313), and the program loops back to block 1295 (FIG. 12G).

Count-based price plans base charges on the number of times that an event occurs. For example, if a CLEC is charged for queries to a line information database (LIDB), the number of times that the CLEC issues these queries is tallied and multiplied by a prespecified charge for a single such query. The negative branch from block 1295 leads to block 1315 (FIG. 12I) where billing records that are for one or more count-based price plans in a first category are located. For a first billing record located in the immediately preceding block, a charge is calculated by multiplying the count by a rate retrieved from the rate table (block 1317). At block 1319, the charge calculated in the immediately preceding block is added to a count-based subtotal. A count-based record is printed on the bill (block 1321). At block 1323, a test is performed to ascertain whether or not there are any remaining billing records located in block 1315 which have not yet been incorporated into the count-based subtotal. The negative branch from block 1323 leads to block 1331 (to be described hereinafter). The affirmative branch from block 1323 leads to block 1325 where, for the next billing record located in block 1315, a charge is calculated by multiplying the count by a rate retrieved from the rate table. The charge calculated in the immediately preceding block is added to the count-based subtotal (block 1327). A count-based record is printed on the bill (block 1329), and the program loops back to block 1323.

The negative branch from block 1323 leads to block 1331 where the count-based subtotal is printed on the bill. The count-based subtotal is added to the bill period total (block 1333). At block 1335, a test is performed to ascertain whether or not there are any billing records for one or more count-based price plans in an Nth category, N being a positive integer greater than one. If not, the program advances to block 1357 (to be described hereinafter). The affirmative branch from block 1335 leads to block 1337 where billing records pertaining to count-based price plans in an Nth category are located. For the first billing record located in block 1337, a charge is calculated by multiplying the count by a rate retrieved from the rate table (block 1339). At block 1341, the charge calculated in the immediately preceding block is added to the count-based subtotal. A count-based record is printed on the bill (block 1343).

At block 1345, a test is performed to ascertain whether or not there are any remaining records located in block 1337 which have not yet been incorporated into the count-based subtotal. The negative branch from block 1345 leads to block 1353 (to be described hereinafter). The affirmative branch from block 1345 leads to block 1347 where, for the next billing record located in block 1337, a charge is calculated by multiplying a number of counts by a rate retrieved from the rate table. The charge calculated in the immediately preceding block is added to the count-based subtotal (block 1349). A count-based record is printed on the bill (block 1351), and the program loops back to block 1345.

The negative branch from block 1345 leads to block 1353 where the count-based subtotal is printed on the bill. The count-based subtotal is added to a bill period total (block 1355), and the program loops back to block 1335. The negative branch from block 1335 (FIG. 12J) leads to block 1357 (FIG. 12L) where the bill period total is printed on the bill. The bill period total is added to the bill total (block 1359). At block 1361, a test is performed to ascertain whether or not there are more billing periods to be considered. If so, the program loops back to block 1253 (FIG. 12D). The negative branch from block 1361 leads to block 1363 where the bill total is printed on the bill. The program then terminates.

Figure 1:
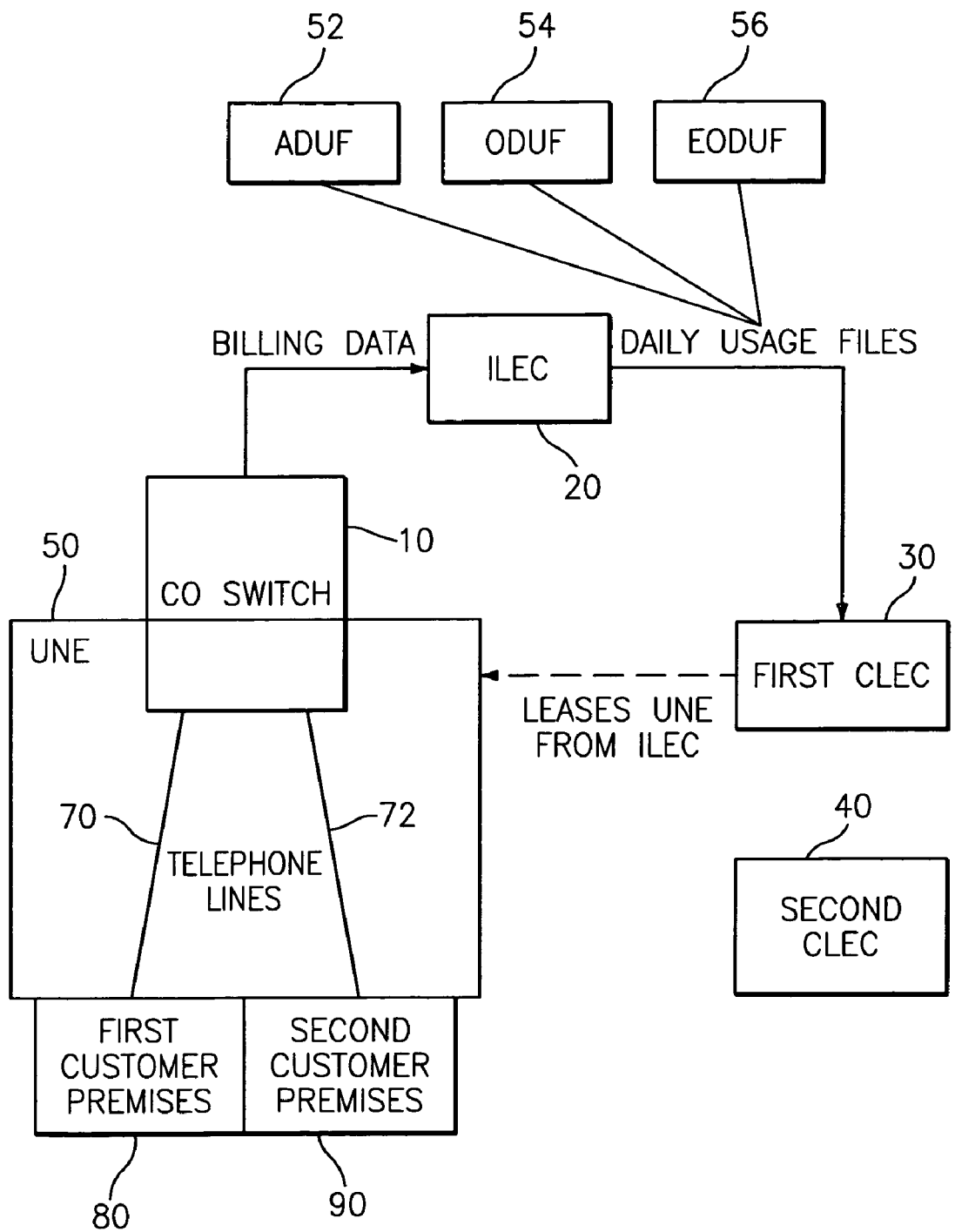
FIG. 1 is a block diagram illustrating functional relationships between an incumbent local exchange carrier (ILEC) and a plurality of competitive local exchange carriers (CLECs)

FIG. 13 depicts a first portion 1401 of an illustrative billing statement prepared using the methods of FIGS. 7-12L, showing an unbilled item from a previous billing period. The bill relates to CLEC usage of a UNE 50 (FIG. 1) CO switch 10 designated as "ATLNGABUDS2". More specifically, the alphanumeric sequence "ATLNGABUDS2" is a CLLI which uniquely specifies a particular CO switch, such as CO switch 10 (FIG. 1). A first rate element 1403 includes a charge pertaining to "unbundled local switching-switching functionality access, terminating" for May 23. The price plan is designated using an illustrative price plan identifier of "OULSC". The rate is designated using an illustrative rate identifier of ULS-SF. The billed quantity is one, with a rate of 0.000615300. This rate is retrieved from customer price plan and rate table 636, FIG. 6. The billing statement portion of FIG. 13 depicts total usage charges for the previous billing period of one cent.

FIG. 14 depicts a second portion 1501 of an illustrative billing statement showing CLEC usage of a CO switch identified by the CLLI "ATLNGABUDS2". Second portion 1501 was prepared using the methods of FIGS. 7-12L, showing a mileage-based rate element 1503. Rate element 1503 shows billing for "unbundled transport-shared transport, local, undetermined routing, originating" pertaining to calls originating at the "ATLNGABUDS2" switch and traversing three additional switches designated by respective CLLIs of ALPRGAMA47C, ATLAGABUCA0, and ATLAGAMVDS3. From originating switch ATLNGABUDS2, switch ALPRGAMA47C carried 4 calls for 19 miles each, switch ATLAGABUCA0 carried 18 calls for 6 miles each, and switch ATLAGAMVDS3 carried 39 calls for 6 miles each. The total charge for routing the calls through the aforementioned switches is three cents, based upon the total mileage between the switches.

FIG. 15 depicts a third portion 1601 of an illustrative billing statement prepared using the methods of FIGS. 7-12L, showing a count-based rate element 1603 and total usage charges. Price plan identifier OU8Q1 applies to a 1-800 access, 10 digit screening call, and price plan identifier OUCC1 applies to directory assistance call completion. Third portion 1601 also shows total usage charges of 41 cents for a billing period extending from August 28 to September 27, as well as total usage charges of 42 cents for all periods.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for constructing a billing statement from a plurality of detailed usage file (DUF) records relating to usage of an unbundled network element (UNE), the method comprising:
   (a) downloading a master file from an incumbent local exchange carrier (ILEC), wherein the master file contains routing information associating each of a respective plurality of telephone numbering plan addresses plus additional telephone number digits (NPA-NXX) with a corresponding geographically defined local access transport area (LATA);
   (b) downloading one or more telephone operator services (TOPS) assignment files, each TOPS assignment file including a list of one or more TOPS switches that are used for calls originating at a particular NPA-NXX;
   (c) generating an enhanced master file by using the one or more TOPS assignment files to edit the master file;
   (d) downloading a plurality of DUF records;
   (e) filtering the downloaded DUF records to thereby generate a set of enhanced DUF records;
   (f) downloading a rate table associating each of a plurality of end users with customer price plans;
   (g) extracting information about calls placed by each of a plurality of end users from the set of enhanced DUF records and the enhanced master file; and
   (h) applying the extracted information to the customer price plans in the rate table to generate a constructed billing statement that reflects usage of the UNE.

2. The method of claim 1 wherein the additional telephone number digits (NXX) comprise three telephone number digits.

3. The method of claim 1 further including downloading one or more Local Exchange Routing Guide (LERG) files containing information relating to the routing of a plurality of NPA-NXX's, and wherein generating an enhanced master file further includes using the one or more LERG files to edit the master file.

4. The method of claim 1 wherein the downloaded DUF records comprise at least one of an access daily usage file (ADUF), an optional daily usage file (ODUF), or an enhanced optional daily usage file (EODUF).

5. The method of claim 1 further comprising comparing the constructed billing statement with an issued billing statement prepared by the ILEC, thus permitting a reconciliation of the constructed billing statement with the issued billing statement.

6. The method of claim 1 wherein filtering the downloaded DUF records is performed using at least one of:
   (i) a DUF killer/cancel record specifying cancellation of a corresponding earlier DUF record;
   (ii) a DUF record header that specifies a time at which the UNE was utilized;

(iii) a DUF record that includes Q account data uniquely identifying a competitive local exchange carrier (CLEC) that utilized the UNE; or (iv) a set of group rules.

7. The method of claim 6 wherein filtering the downloaded DUF records using the one or more DUF killer/cancel records is performed by:

conducting a search of the downloaded DUF records to identify a subsequent DUF killer/cancel record specifying cancellation of a corresponding earlier DUF record; and if a subsequent DUF killer/cancel record is identified, disabling or deleting the corresponding earlier DUF record, and deleting the subsequent DUF killer/cancel record from the downloaded DUF records, to thereby generate a set of enhanced DUF records.

8. The method of claim 6 wherein filtering the downloaded DUF records using a DUF record header that specifies a time at which the UNE was utilized includes:

downloading parameter data specifying a period that the billing statement is to cover; and generating the set of enhanced DUF records by comparing the DUF record header with the downloaded parameter data, such that one or more downloaded DUF records corresponding to calls which did not occur during the specified period are eliminated from the set of enhanced DUF records.

9. A computer program product for constructing a billing statement from a plurality of detailed file usage (DUF) records relating to usage of an unbundled network element (UNE), the computer program product comprising:

a storage medium readable by a processing circuit and storing instructions for execution by the processing circuit for facilitating a method comprising:

(a) downloading a master file from an incumbent local exchange carrier (ILEC), wherein the master file contains routing information associating each of a respective plurality of telephone numbering plan addresses plus additional telephone number digits (NPA-NXX) with a corresponding geographically defined local access transport area (LATA);

(b) downloading one or more telephone operator services (TOPS) assignment files, each TOPS assignment file including a list of one or more TOPS switches that are used for calls originating at a particular NPA-NXX;

(c) generating an enhanced master file by using the one or more TOPS assignment files to edit the master file;

(d) downloading a plurality of DUF records;

(e) filtering the downloaded DUF records to thereby generate a set of enhanced DUF records;

(f) downloading a rate table associating each of a plurality of end users with customer price plans;

(g) extracting information about calls placed by each of a plurality of end users from the set of enhanced DUF records and the enhanced master file; and (h) applying the extracted information to the customer price plans in the rate table to generate a constructed billing statement that reflects usage of the UNE.

10. The computer program product as recited in claim 9 wherein the additional telephone number digits (NXX) comprise three telephone number digits.

11. The computer program product as recited in claim 9 wherein the storing instructions further comprise computer-executable instructions for downloading one or more Local Exchange Routing Guide (LERG) files containing information relating to the routing of a plurality of NPA-NXX's, and wherein the generating of an enhanced master file further includes using the one or more LERG files to edit the master file.

12. The computer program product as recited in claim 9 wherein the downloaded DUF records comprise at least one of an access daily usage file (ADUF), an optional daily usage file (ODUF), or an enhanced optional daily usage file (EODUF).

13. The computer program product as recited in claim 12 wherein the filtering is performed using at least one of:

(i) a DUF killer/cancel records specifying cancellation of a corresponding earlier DUF record;

(ii) a DUF record header that specifies a time at which the UNE was utilized;

(iii) a DUF record that includes Q account data uniquely identifying a competitive local exchange carrier (CLEC) that utilized the UNE; and (iv) a set of group rules.

14. The computer program product as recited in claim 13 wherein the filtering is performed by:

conducting a search of the downloaded DUF records to identify a subsequent DUF killer/cancel record specifying cancellation of a corresponding earlier DUF record; and if a subsequent DUF killer/cancel record is identified, disabling or deleting the corresponding earlier DUF record, and deleting the subsequent DUF killer/cancel record from the downloaded DUF records, to thereby generate a set of enhanced DUF records.

15. The computer program product as recited in claim 12 wherein the filtering includes:

downloading parameter data specifying a period that the billing statement is to cover; and generating the set of enhanced DUF records by comparing the DUF record header with the downloaded parameter data, such that one or more downloaded DUF records corresponding to calls which did not occur during the specified period are eliminated from the set of enhanced DUF records.

16. The computer program product as recited in claim 9 wherein the filtering includes:

selecting a CLEC for which a billing statement is to be constructed;

performing a search of the downloaded DUF records to identify one or more DUF records that include a Q account number which uniquely identify the CLEC to be billed; and eliminating DUF records corresponding to calls which were not made by the CLEC to be billed.

17. A computer system for computing financial data, the computer system comprising:

a digital computer for receiving information comprising a master file, one or more telephone operator service (TOPS) assignment files, a plurality of daily usage file records, and a rate table from a data input; and a database for electronically storing data from the digital computer, wherein the computer computes the data from the information, the data representing a constructed billing statement relating to usage of an unbundled network element (UNE), and wherein:

(a) the master file contains routing information associating each of a respective plurality of telephone numbering plan addresses plus additional telephone number digits (NPA-NXX) with a corresponding geographically defined local access transport area (LATA);

(b) the one or more telephone operator services (TOPS) assignment files each include a list of one or more TOPS switches that are used for calls originating at a particular NPA-NXX;

(c) the rate table associates each of a plurality of end users with customer price plans; and (d) the data is computed from the information by generating an enhanced master file using the one or more TOPS assignment files to edit the master file, filtering the DUF records to thereby generate a set of enhanced DUF records, extracting information about calls placed by each of a plurality of end users from the set of enhanced DUF records and the enhanced master file, and applying the extracted information to the customer price plans in the rate table to generate the constructed billing statement reflecting usage of the UNE.

18. The computer system of claim 17 wherein the additional telephone number digits (NXX) comprise three telephone number digits.

19. The computer system of claim 17 wherein the digital computer is connected to receive further information comprising one or more Local Exchange Routing Guide (LERG) files containing information relating to the routing of a plurality of NPA-NXX's, and wherein the digital computer uses the one or more LERG files to edit the master file.

20. The computer system of claim 17 wherein the DUF records comprise at least one of an access daily usage file (ADUF), an optional daily usage file (ODUF), or an enhanced optional daily usage file (EODUF).

21. The computer system of claim 20 wherein filtering the downloaded DUF records is performed using one or more DUF killer/cancel records specifying cancellation of a corresponding earlier DUF record.

22. The computer system of claim 21 wherein filtering the downloaded DUF records using the one or more DUF killer/cancel records is performed by:

conducting a search of the downloaded DUF records to identify a subsequent DUF killer/cancel record specifying cancellation of a corresponding earlier DUF record; and if a subsequent DUF killer/cancel record is identified, disabling or deleting the corresponding earlier DUF record, and deleting the subsequent DUF killer/cancel record from the downloaded DUF records, to thereby generate a set of enhanced DUF records.

23. The computer system of claim 17 wherein filtering downloaded DUF records includes:

(a) formulating a set of group rules;

(b) applying the set of group rules to a downloaded DUF record to identify a group for the DUF record that is selected from a plurality of groups;

(c) based upon the selected group, retrieving telephone numbering plan addresses plus the next three digits (NPA-NXX) information for the DUF record;

(d) using the retrieved NPA-NXX information to access a lookup table in the downloaded master file to obtain a Common Language Identifier (CLLI) identifying a central office (CO) switch that carried the call identified in the DUF record;

(e) associating the DUF record with at least one of: (i) a group identifier corresponding to the selected group, (ii) a Q account identifier corresponding to the CLEC, and (iii) a CLLI identifier corresponding to the identified CO switch; and (f) repeating steps (b)-(e) for each of a plurality of downloaded DUF records, to thereby generate a set of enhanced DUF records.

* * * * *